US012657828B2

(12) United States Patent
Hoque et al.

(10) Patent No.: US 12,657,828 B2
(45) Date of Patent: Jun. 16, 2026

(54) SYSTEM AND METHODS FOR DETERMINING A QUALITY METRIC OF THREE-DIMENSIONAL IMAGE DATA

(71) Applicant: XRPro, LLC, Boulder, CO (US)

(72) Inventors: Kazi Miftahul Hoque, Jashore (BD); Paulo E. Xavier da Silveira, Boulder, CO (US); Anton Aleksandrovich Tokar, Longmont, CO (US); Isobel Jane Mulligan, Niwot, CO (US); Dmitrii Aleksandrovich Gladyshev, Longmont, CO (US); Ravi Vibhakar Shah, Boulder, CO (US)

(73) Assignee: XRPro, LLC, Boulder, CO (US)

( * ) Notice: Subject to any disclaimer, the term of this patent is extended or adjusted under 35 U.S.C. 154(b) by 139 days.

(21) Appl. No.: 18/798,224

(22) Filed: Aug. 8, 2024

(65) Prior Publication Data

US 2025/0054239 A1     Feb. 13, 2025

Related U.S. Application Data

(60) Provisional application No. 63/531,612, filed on Aug. 9, 2023.

(51) Int. Cl.
*G06T 17/20* (2006.01)
*G06T 7/00* (2017.01)

(52) U.S. Cl.
CPC ............ *G06T 17/20* (2013.01); *G06T 7/0002* (2013.01); *G06T 2207/30168* (2013.01)

(58) Field of Classification Search
CPC ....................................................... G06T 17/20
See application file for complete search history.

(56) References Cited

U.S. PATENT DOCUMENTS

| | | | |
|---|---|---|---|
| 2017/0046868 A1* | 2/2017 | Chernov | G06T 7/246 |
| 2021/0279950 A1* | 9/2021 | Phalak | G06F 18/231 |
| 2024/0185523 A1* | 6/2024 | Zhang | G06F 30/27 |

* cited by examiner

*Primary Examiner* — Shivang I Patel
(74) *Attorney, Agent, or Firm* — Lee & Hayes, P.C.

(57) ABSTRACT

A system for determining a quality metric of a three-dimension mesh generated from a scan of an object. In some cases, the system may utilize a representative object to determine the one or more quality metrics. The quality metric may indicate a usability of the three-dimensional mesh for an operation, such as generation of a prosthetic, surgery, or the like.

20 Claims, 16 Drawing Sheets

100

200

RECEIVE AN INITIAL THREE-DIMENSIONAL MESH OF AN OBJECT
202

DETERMINE AN APPROXIMATE GROUND PLANE OF THE INITIAL MESH
204

GENERATE A REFINED MESH BASED AT LEAST IN PART ON THE
APPROXIMATE GROUND PLANE
206

DETERMINE A PERCENTAGE OF THE OBJECT REPRESENTED IN THE REFINED
MESH
208

300

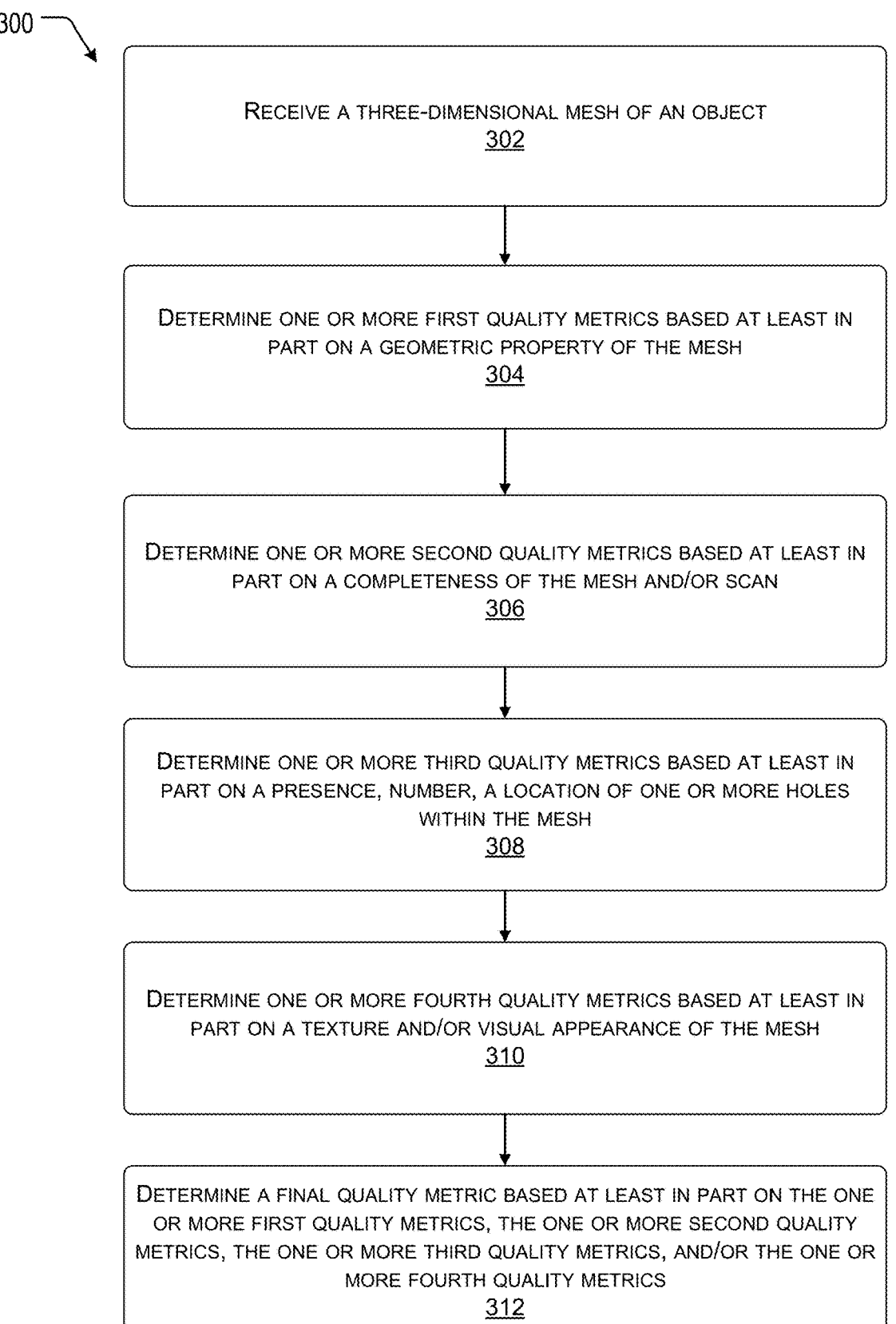

RECEIVE A THREE-DIMENSIONAL MESH OF AN OBJECT
302

DETERMINE ONE OR MORE FIRST QUALITY METRICS BASED AT LEAST IN PART ON A GEOMETRIC PROPERTY OF THE MESH
304

DETERMINE ONE OR MORE SECOND QUALITY METRICS BASED AT LEAST IN PART ON A COMPLETENESS OF THE MESH AND/OR SCAN
306

DETERMINE ONE OR MORE THIRD QUALITY METRICS BASED AT LEAST IN PART ON A PRESENCE, NUMBER, A LOCATION OF ONE OR MORE HOLES WITHIN THE MESH
308

DETERMINE ONE OR MORE FOURTH QUALITY METRICS BASED AT LEAST IN PART ON A TEXTURE AND/OR VISUAL APPEARANCE OF THE MESH
310

DETERMINE A FINAL QUALITY METRIC BASED AT LEAST IN PART ON THE ONE OR MORE FIRST QUALITY METRICS, THE ONE OR MORE SECOND QUALITY METRICS, THE ONE OR MORE THIRD QUALITY METRICS, AND/OR THE ONE OR MORE FOURTH QUALITY METRICS
312

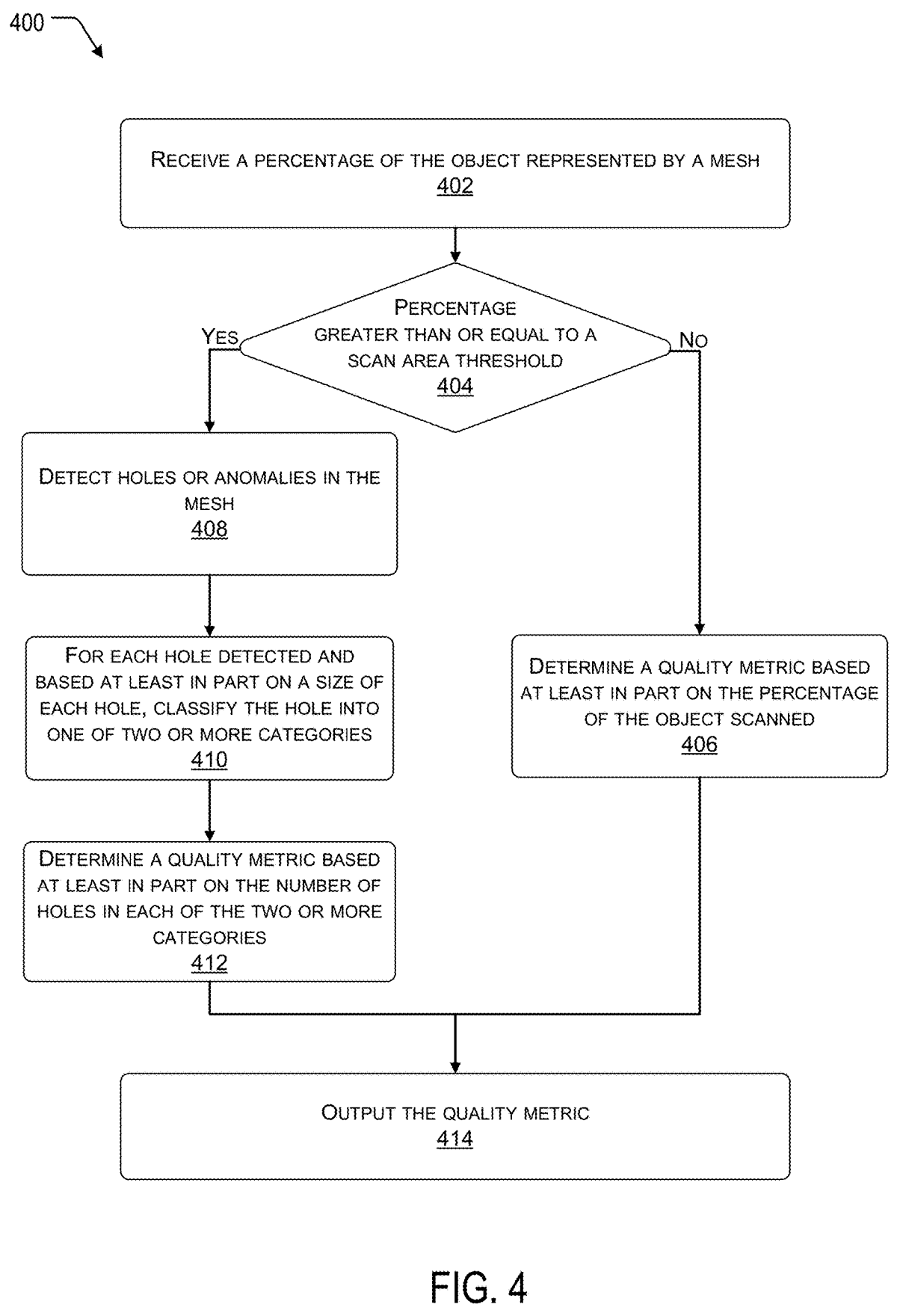

RECEIVE A PERCENTAGE OF THE OBJECT REPRESENTED BY A MESH
402

PERCENTAGE GREATER THAN OR EQUAL TO A SCAN AREA THRESHOLD
404

YES

NO

DETECT HOLES OR ANOMALIES IN THE MESH
408

DETERMINE A QUALITY METRIC BASED AT LEAST IN PART ON THE PERCENTAGE OF THE OBJECT SCANNED
406

FOR EACH HOLE DETECTED AND BASED AT LEAST IN PART ON A SIZE OF EACH HOLE, CLASSIFY THE HOLE INTO ONE OF TWO OR MORE CATEGORIES
410

DETERMINE A QUALITY METRIC BASED AT LEAST IN PART ON THE NUMBER OF HOLES IN EACH OF THE TWO OR MORE CATEGORIES
412

OUTPUT THE QUALITY METRIC
414

FIG. 4

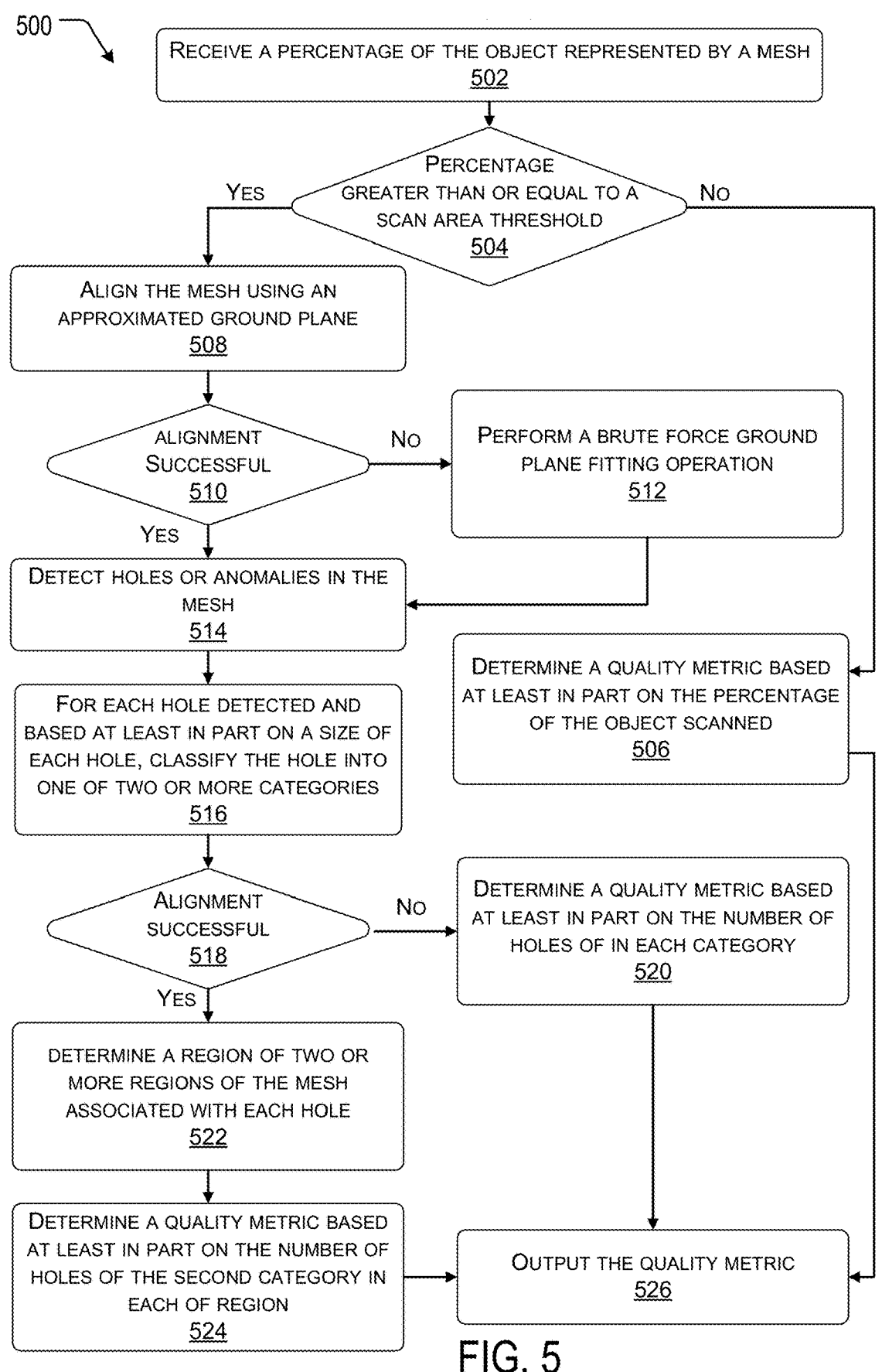

500

RECEIVE A PERCENTAGE OF THE OBJECT REPRESENTED BY A MESH
502

PERCENTAGE GREATER THAN OR EQUAL TO A SCAN AREA THRESHOLD
504

YES — ALIGN THE MESH USING AN APPROXIMATED GROUND PLANE
508

No — DETERMINE A QUALITY METRIC BASED AT LEAST IN PART ON THE PERCENTAGE OF THE OBJECT SCANNED
506

ALIGNMENT SUCCESSFUL
510

No — PERFORM A BRUTE FORCE GROUND PLANE FITTING OPERATION
512

YES — DETECT HOLES OR ANOMALIES IN THE MESH
514

FOR EACH HOLE DETECTED AND BASED AT LEAST IN PART ON A SIZE OF EACH HOLE, CLASSIFY THE HOLE INTO ONE OF TWO OR MORE CATEGORIES
516

ALIGNMENT SUCCESSFUL
518

No — DETERMINE A QUALITY METRIC BASED AT LEAST IN PART ON THE NUMBER OF HOLES OF IN EACH CATEGORY
520

YES — DETERMINE A REGION OF TWO OR MORE REGIONS OF THE MESH ASSOCIATED WITH EACH HOLE
522

DETERMINE A QUALITY METRIC BASED AT LEAST IN PART ON THE NUMBER OF HOLES OF THE SECOND CATEGORY IN EACH OF REGION
524

OUTPUT THE QUALITY METRIC
526

FIG. 5

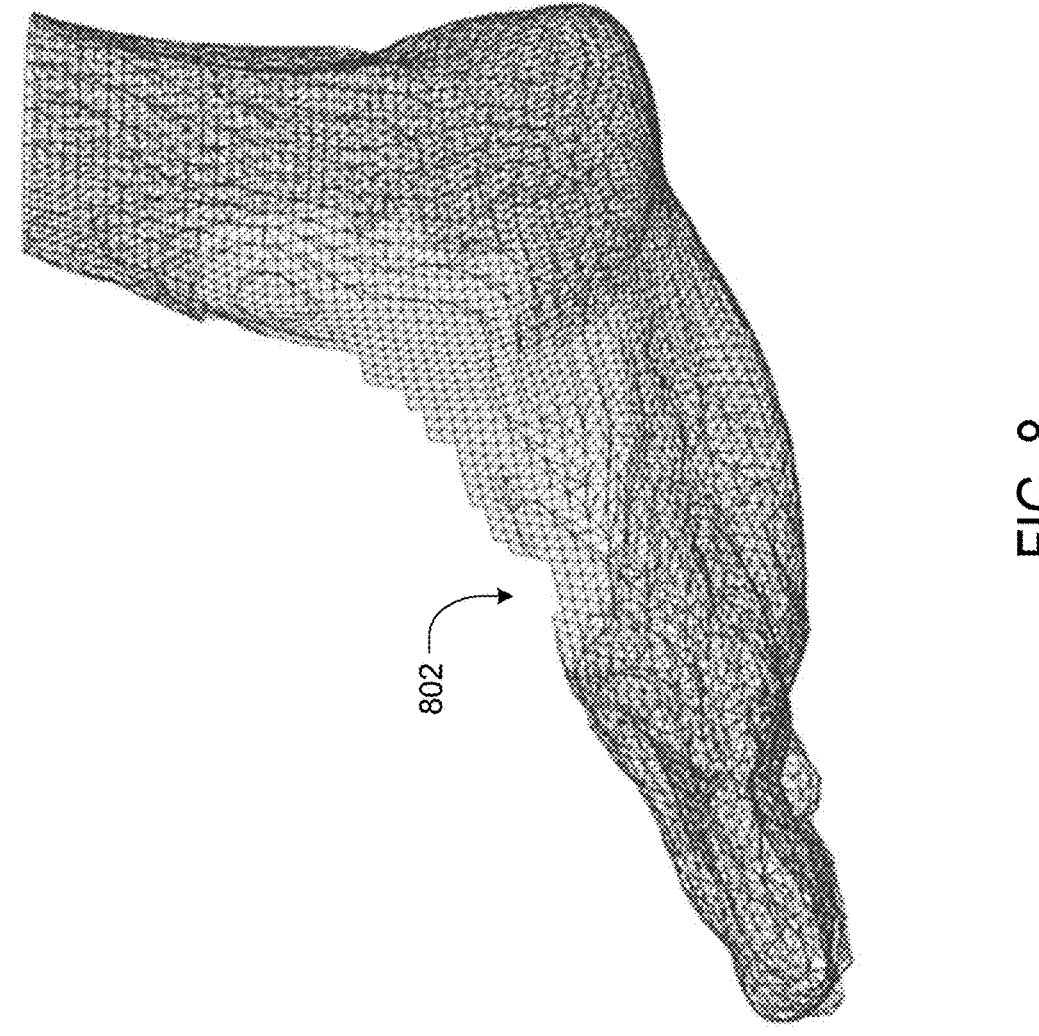
802
800
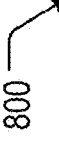
FIG. 8

1000

1002

1004

1100

1200

1500

1600

SYSTEM AND METHODS FOR DETERMINING A QUALITY METRIC OF THREE-DIMENSIONAL IMAGE DATA

CROSS-REFERENCE TO RELATED APPLICATION(S)

This application claims priority to U.S. Provisional Application No. 63/531,612 filed on Aug. 9, 2023 and entitled "System and Methods for Determining a Quality Metric of Three-Dimensional Image Data," which is incorporated herein by reference in its entirety.

BACKGROUND

Today, the quality of three-dimensional meshes associated with three-dimensional scanning and imaging is becoming more and more of a concern with respect to various fields, such as the medical field. These fields require high accuracy and realism that is typically less of a concern with traditional three-dimensional imaging and virtual reality fields, such as gaming. In many cases even a slight degradation of quality in a three-dimensional mesh may render the mesh unusable for its intended purpose.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3 is another example process flow diagram of a process for determining quality metrics associated with a 3D mesh of an object according to some implementations.

FIG. 4 is another example process flow diagram of a process for determining quality metrics associated with a 3D mesh of an object according to some implementations.

FIG. 5 is another example process flow diagram of a process for determining quality metrics associated with a 3D mesh of an object according to some implementations.

FIG. 8 is an example pictorial diagram of a three-dimensional mesh of an object according to some implementations.

DETAILED DESCRIPTION

Figure 1:
FIG. 1 is an example block diagram of an architecture for a scan quality determining system according to some implementations.

Discussed herein are systems and methods for determining or measuring, as well as standardizing and comparing, a quality metric of a three-dimensional (3D) mesh generated as part of operations associated with or from a 3D scan of a physical object, such as limb, feature, or part of the human body. In some cases, the quality metric, discussed herein, may allow a user (such as a surgeon, doctor, medical expert, other expert in their field, or other users) to quickly determine if the 3D mesh is reliable to an extent required by the field of use or if another new 3D scan or 3D mesh is required prior to performing an operation based on the 3D mesh.

In some specific examples, the quality concerns may be associated with particular characteristics of 3D meshes that permit a mesh to be used effectively to perform numerical partial differential equations with fidelity to the underlying physics (e.g., reliability above a fidelity threshold specific to the underlying physics and the associated field). The quality concerns may also relate to an accuracy required by various problems in the field (e.g., reliability above an accuracy threshold specific to the associated field). In some cases, mesh quality depends on the particular calculation (e.g., reliability above a calculation threshold specific to the operation and 3D scan within the field), which is undertaken with respect to the specific field and operation and, thus, changes if a different calculation is performed (even within the same field). In addition, 3D meshes play an important role in the manufacturing of custom components, such as medical prosthetics, orthotics and implants, in which case a high quality 3D mesh representation of an individual's body is important to ensure positive patient outcomes.

As discussed herein, the system and methods of determining a quality metric of a 3D mesh may include one or more indicators, values, and/or metrics representative of a 3D mesh quality or reliability for a specific field and/or operation. In some instances, the quality metric may include indicators, values, and/or metrics associated with holes, noise, inconsistency, or other anomalies that are present in the image data and/or the resulting 3D mesh. For example, in the particular case associated with scanning a human foot or human feet, the system may detect if key parts, features, or regions of the foot are present in the 3D mesh. For instance, the presence of a heel cup, a first and last metatarsal, a plantar side and an upper side of foot improve the overall quality metrics.

As another example of features or inputs, utilized to generate the overall quality metrics, may include evaluations of or metrics associated with geometric qualities of the image data, scan data, and/or the resulting 3D mesh. For instance, the evaluations of or metrics may include one or more skewness metric based on an equiangular skew that penalizes elements of the scan or mesh having large or small angles (e.g., above or below one or more thresholds or outside given ranges) as compared to angles in an ideal or representative element, scan, and/or object. For instance, a reportative element, such as a foot, may be generated based at least in part on a plurality of associated 3D meshes (e.g., of the foot) of various individuals. As one illustrative example, the representative element or mesh may be generated or output using one or more machine learning models or networks having the plurality of good 3D meshes of the corresponding element as an input.

As another example, the evaluations or metrics may include one or more maximum angle metric. The maximum angle metric may be determined based at least in part on presence of elements with large angles, such as applying a penalty or reduction in the metric score when detected. In some cases, the maximum angle metric is particularly well suited for determining scores of 3D meshes in which anisotropic elements are desired, such as boundary layer meshes. In some cases, one or more volume versus circumradius metrics may also be utilized. The volume versus circumradius metrics may be based at least in part on a quotient of the element volume and the radius of the circumscribed sphere (or circle) of the element. In this manner, the volume versus circumradius metrics are sensitive to large angles, small angles, and anisotropy.

The evaluations or metrics may also include one or more volume versus length metrics, a conditions number metric, a growth rate metric, a curved skewness metric, an aspect ratio metric, a Jacobian or Jacobian ratio metric and the like. The volume versus length metrics are based at least in part on a quotient of an edge length of the element and a volume of the element as compared to each other and/or the representative element. This quality measure is primarily sensitive to anisotropy. The condition number quality metrics are based at least in part on properties of a matrix transformation of the actual element to the ideal or representative element. The growth rate metrics are based at least in part on a comparison of the local element size to the sizes of neighboring elements in all directions within the 3D mesh or scan (e.g., via one or more change in size thresholds or differential thresholds).

The curved skewness quality metrics are a measure of a deformation from generating one or more higher-order elements (e.g., curved elements, toes and heels if the object is a foot, or the like). For example, in a foot the toes have a high degree of curved skewness, thus being a higher order element. The plantar surface, on the other hand, is nearly flat. The Aspect ratio metrics may be configured to quantify a quality of the elements, where a value such as "1" is considered a match with the representative tetrahedral element and the element shape has a lower quality metric when a higher aspect ratio metric is assessed. The Jacobian or Jacobian ratio metrics are representative of a measure of a deviation of a given element from an ideally shaped element or the representative element. In some examples, the Jacobian metric may range from −1.0 to 1.0, where 1.0 represents a match with the representative element.

In some examples, the features or inputs, utilized to generate the overall quality metrics, may also include determination on a basis of visual appearance. For instance, a Blind Mesh Quality Assessment Index (BMQI) which is based at least in part on an estimation of visual saliency and roughness may be used to determine a quality of the visual appearance of the 3D mesh.

In some examples, the system may determine the quality metrics by initially performing hole filling on the 3D mesh and comparing the resulting 3D mesh with the Hausdorff distance. A good (or high scoring) 3D mesh will have a Hausdorff distance that is within a threshold (e.g., proximate) of the original mesh after hole filling operations are complete. The geometric qualities, discussed above—e.g., the skewness metric, the aspect ratio metric, and the like, may then be determined, for example by, testing or comparing with the representative elements or meshes as well as with known bad or low scoring meshes of the element or feature.

As another example, the system may employ a "canonical" object (e.g., a characterized or simplified foot scan) as a model (e.g., the representative element or feature) and measure a Euclidian distance from a current truncated signed differences function (TSDF) surface to the canonical object model, such as by using ray projection techniques. In this example, the system may apply scaling and orientation to the canonical mesh with respect to the 3D mesh. In some cases, the system may register an existing mesh (e.g., the representative mesh) with respect to the generated 3D mesh based at least in part on the bounding boxes of each mesh perform an initial alignment. Following initial alignment, the system may apply a iterative closest point (ICP) technique to further refine the alignment between the representative mesh and the generated 3D mesh or the mesh being evaluated and scored on quality. In some cases, the system may also apply one or more loop-closure detection techniques to confirm that the generated 3D mesh is complete (e.g., free of holes or other anomalies).

In addition to scanning device output meshes that are incomplete or have holes and/or missing features, there are scanning conditions and/or equipment that may cause distortions in the TSDF, such as resulting from lost tracking during scanning of the object. For example, when a camera pose is not accurately estimated by the scanning device, new depth frames often fail to be accurately integrated into the TSDF used to generate the 3D mesh. In these cases, the system, discussed herein, may utilize measurements of the ICP techniques to determine a tracking accuracy metric. The tracking accuracy metric may be determined or measured based at least in part on the residuals or the differences in image-based prediction (e.g., reprojected) versus or compared to an observed intensity or shift values for each new viewpoint of the image device or camera pose. In some cases, reporting or integrating summary statistics on ICP residuals for regions of the TSDF and resulting mesh provides another input to assist in determining the quality metrics and, accordingly, the fidelity of the output 3D mesh.

In some examples a quality metric may be generated while a scan is performed or captured by a scanning device. For instance, as a system begins or initiates scanning operations an initial TSDF may be generated. At this time, the system may cause a quality metric to be presented on a display of the scanning system or device that represents a low quality score. As the system continues to scan the object, the system may allow a desired number (e.g., predetermined number) of TSDF points to be updated then determine an updated quality scores. For instance, the quality metrics may be determined by aligning and scaling the bounding boxes (e.g., canonical and scanned), such as discussed herein, and/or by combining metrics or measures, such as the geometric qualities metrics discussed above, for a current TSDF. In some cases, the system may perform operations associated with a marching cubes technique to obtain an instantaneous 3D mesh associated with the TSDF and then apply a root mean square (RMS) of an Euclidian distance between voxels in a surface of the TSDF to a nearest point in the representative element or feature (e.g., the conical foot) to estimate a current scan quality metric. The current scan quality metric may then be presented on the display to show the quality of the scan or resulting mesh improving as scanning operations are performed.

It should be understood, that in some cases, the substantially real-time or concurrent quality metrics associated or displayed during scanning may be an initial quality metric and subsequent quality metrics may be determined after the 3D mesh is fully processed (e.g., such as an output of a post scan processing system, processes, and/or techniques). It should also be understood that the examples described above may be used in isolation or in combination. For example, the final quality metrics may be determined from a combination of metrics or techniques discussed herein. Accordingly, in some implementations, final quality metrics associated with a 3D mesh may include a weighted average of a plurality of metrics or scores (or other type of combination, such as one or more RMS deviation between those metrics and their nominal values). As one specific example, the system may combine metrics using a Nth root of metrics raised to different powers (such as to account for metrics that differ by orders of magnitude). As another example, the system may combine metrics using a weighed harmonic average (such as when metrics have inverse relationships with respect to each other).

In some cases, the system may utilize one or more machine learning models to assist with determining individualized metrics, such as the geometric qualities metrics, or more of the quality metrics or the like. In some cases, the one or more machine learning models may receive the TSFD, initial mesh, final 3D mesh, image data, or the like as an input and output the resulting metrics, scores, or adjusted 3D mesh as discussed herein. In some cases, multiple machine learning models may be utilized to generate portions or individual ones of the one or more quality metrics associated with a 3D mesh.

The one or more machine learning models may be trained using 3D mesh data, image data, scan data, or the like associated with multiple instances of an object (such as a foot) in various states (e.g., complete, fragmented or disjointed, including holes or other anomalies at various locations within the object, and the like). In some cases, the training data may include various instances of the object, such as a foot from multiple individuals including variations between each object of the class of objects. As one specific example, the machine learning models may be trained to segment an object from other objects within image data, classify the object and then subsequently generate the 3D mesh and/or one or more quality metrics based on the input image data, as discussed herein.

As described herein, the machine learning models may be generated using various machine learning techniques. For example, the models may be generated using one or more neural network(s). A neural network may be a biologically inspired algorithm or technique which passes input data (e.g., image and sensor data captured by the IoT computing devices) through a series of connected layers to produce an output or learned inference. Each layer in a neural network can also comprise another neural network or can comprise any number of layers (whether convolutional or not). As can be understood in the context of this disclosure, a neural network can utilize machine learning, which can refer to a broad class of such techniques in which an output is generated based on learned parameters.

As an illustrative example, one or more neural network(s) may generate any number of learned inferences or heads from the captured sensor and/or image data. In some cases, the neural network may be a trained network architecture that is end-to-end. In one example, the machine learned models may include segmenting and/or classifying extracted deep convolutional features of the sensor and/or image data into semantic data. In some cases, appropriate truth outputs of the model in the form of semantic per-pixel classifications (e.g., vehicle identifier, container identifier, driver identifier, and the like).

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like. In some cases, the system may also apply Gaussian blurs, Bayes Functions, color analyzing or processing techniques and/or a combination thereof.

FIG. 1 is an example block diagram of an architecture 100 for a scan quality determining system 102 according to some implementations. In the current example, user equipment 104, such as a sensor device 106 and a processing device 108, may be used to generate 3D image data 112 representative of an object, such as a foot 110 of a patient in the current example. In other examples, the object may include other body parts such as a head, a hand, a limb, torso, or the entire body of the individual as well as other objects, such as furniture, foliage or vegetation (e.g., a leaf, limb, trunk, or the like), features or portions of an animal, vehicles (e.g., tires, doors, body, engine, and the like), and the like.

In the current example, the sensor device 106 may capture the 3D image data 112 and provide the data 112 to the processing device 108. The processing device 108 may generate an initial 3D mesh 114 associated with the 3D image data 112 and, in some cases, an initial quality metric. In some implementations, both the initial 3D mesh 114 and the initial quality metric may be presented on a display of the processing device 108 and/or the sensor device 106 during scanning. In some instances, the processing device 108 may update the initial 3D mesh 114 and the initial quality metric as the scanning operations are performed to assist the user 116 in capturing a quality scan and reducing anomalies, such as holes, within the 3D image data 112.

In the current example, the sensor device 106 and the processing device 108 of the user equipment 104 are illustrated as separate devices. However, it should be understood that in some cases the user equipment 104 may be a single device for both processing the 3D image data 112 and capturing the 3D image data 112. The single user equipment 104 may also include a user interface and display or a combination touch screen interface to both receive user inputs and present data to the user 116 (such as 3D meshes, the 3D image data, or the like). For example, the user equipment 104 may be configured to provide user data or instructions to assist the user 116 (e.g., the health care professional, the patient, and/or another user assisting the patient, or other user) in capturing each of the scans. For instance, the instructions may include images with missing portions, directions on where to scan, directions on how the patient should stand, instructions to re-scan portion of the foot, and the like. In some cases, the instructions may be interactive such as displaying a 3D mesh or model of the object (e.g., the foot 110) which highlighted or otherwise indicated areas for additional scanning.

After the scanning operations are complete, the user equipment 104 may provide either or both of the image data 112 and/or the initial mesh data 114 to the scan quality determining system 102. The scan quality determining system 102 may generate a processed mesh 118 based at least in part on the image data 112 and/or the initial mesh 114 using various techniques. The system 102 may then determine one or more quality metrics associated with the mesh 118, as discussed herein. For example, the system 102 may utilize the process discussed below with respect to FIGS. 2-5.

In some case, as discussed herein, the system 102 may include cloud-based processing may include of multiple servers, available full-time and on demand, making their services substantially ubiquitous, constantly available, on demand and easily accessible (e.g., additional servers may be quickly activated in times of peak demand). Also, servers may consist of multiple computers in large service centers, using different operating systems, benefiting from lower-cost centralized utilities and services, and from expandable infrastructure, such as multiple parallel central processing units (CPUs), graphic processing units (GPUs), arithmetic logic units (ALUs), tensor processing units (TPUs) and quantum processing units (QPUs), to name a few. In general, cloud-servers may also be referred to as backend-servers or simply backend.

FIGS. 2-5 are flow diagrams illustrating example processes associated with the can quality determining system discussed herein. The processes are illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, when executed by one or more processor(s), perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

Figure 2:
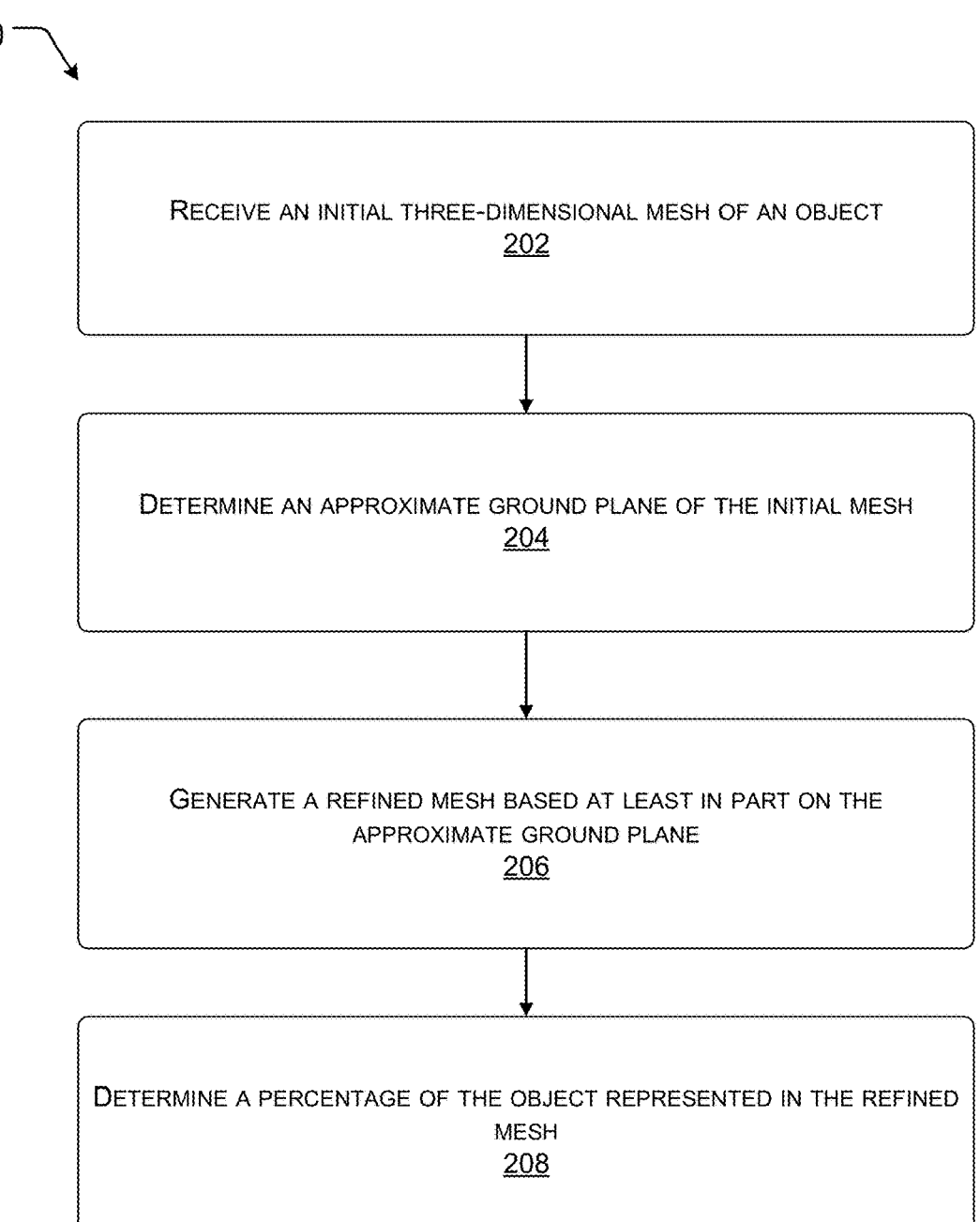
FIG. 2 is an example process flow diagram of a process for determining quality metrics associated with a 3D mesh of an object according to some implementations.

FIG. 2 is an example process flow diagram of a process 200 for determining quality metrics associated with a 3D mesh of an object according to some implementations. As discussed above, the system may generate a 3D mesh of an object being scanned either via the user equipment or via a cloud-based system. In some cases, prior to determining a final or resulting quality metric, the system may refine the mesh, such as via processing via post scanning techniques.

At 202, the system may receive the initial 3D mesh of an object. For instance, as the user equipment scans or captures image data of the object, the user equipment may generate an initial mesh, such as to display to the user preforming the scan and, thereby, aid in capturing of image data usable to generate an accurate and high quality scan of the object. As an example, the system may begin or initiate scanning operations and generate a TSDF. As the user equipment continues to scan the object, the system may allow a desired number (e.g., predetermined number) of TSDF points to be updated. In some cases, the system may perform operations associated with a marching cubes technique to obtain an instantaneous 3D mesh associated with the TSDF.

At 204, the system may determine an approximate ground plane of the initial mesh. For example, the system may perform RANSAC plane fitting to the initial mesh to determine the approximate ground plane. For example, the system may attach various planes at several angles with the mesh of the object. The system may then determine if each attached plane is fit. For example, the system may measure parameters (e.g., length, width, girth, threshold ranges, or the like) with defined landmarks of the object (such as the metatarsal if the object is a foot). For instance, the system may attempt to attach a plane from different angles around the mesh and tests the planes successful alignment. In one example, the system may attempt to fit a cube around the object mesh, such that a plane is fit on each side of the object and/or mesh to determine if the alignment was successful.

At 206, the system may generate a refined mesh based at least in part on the approximate ground plane. For example, the system may apply a RANSAC plane fitting technique.

At 208, the system may determine a percentage of the object represented in the refined mesh. For example, the system may apply bounding boxes to the object and then compare with a stored representative object (e.g., representing an ideal version of the object). In some cases, the system may also determine a total face area (e.g., exterior area) of the refined mesh and then compare with a stored representative object to determine the percentage of the object represented by the refined mesh. For example, the system may dynamically estimate highest total area of the object from a first captured frame of the scan. As the scanning starts from the bottom portion of the object, the estimated total area varies from object to object.

FIG. 3 is another example process flow diagram of a process 300 for determining quality metrics associated with a 3D mesh of an object according to some implementations. As discussed above, the system may utilize a number of different metrics and measurements to determine the quality of the 3D mesh generated by a scan of an object. For example, the system may utilize geometric properties, presence and number of holes or other anomalies, and/or comparisons (e.g., quantifiable similarities and differences) with respect to a representative object or representative mesh of the object.

At 302, the system may receive a 3D mesh of an object. For example, the mesh may be an initial mesh generated by a user equipment or concurrently with the scanning process. In other cases, the mesh may be a final or refined mesh that is generated via post scanning processing using various post scanning techniques.

At 304, the system may determine one or more first quality metrics based at least in part on a geometric property of the mesh. For example, the system may determine one or more skewness metrics, angle metrics, volume versus length metrics, a conditions number metric, a growth rate metric, a curved skewness metric, an aspect ratio metric, a Jacobian or Jacobian ratio metric, and the like. For example, the skewness metric may be based at least in part on an equiangular skew that penalizes elements of the mesh having large or small angles (e.g., above or below one or more thresholds or outside given ranges) as compared to angles in the ideal or representative element, scan, and/or object.

As another example, the maximum angle metric may be determined based at least in part on presence of elements with large angles, such as applying a penalty or reduction in the metric score when detected. In some cases, the maximum angle metric is particularly suited for determining scores of 3D meshes in which anisotropic elements are desired, such as boundary layer meshes. In some cases, one or more volume versus circumradius metrics may also be utilized. The volume versus circumradius metrics may be based at least in part on a quotient of the element volume and the radius of the circumscribed sphere (or circle) of the element. In this manner, the volume versus circumradius metrics are sensitive to large angles, small angles, and anisotropy.

As yet other examples, the volume versus length metrics may be based at least in part on a quotient of an edge length of the element and a volume of the element such as compared to the representative element. This quality measure is primarily sensitive to anisotropy. The condition number quality metrics may be based at least in part on properties of a matrix transformation of the actual element to the ideal or representative element. The growth rate metrics may be based at least in part on a comparison of the local element size to the sizes of neighboring elements in all directions within the 3D mesh or scan (e.g., via one or more change in size thresholds or differential thresholds). The curved skewness quality metrics may be a measure of a deformation from generating one or more higher-order elements (e.g., curved elements or the like). The Aspect ratio metrics may be configured to quantify a quality of the elements, where a value such as "1" is considered a match with the representative tetrahedral element and the element shape has a lower quality metric when a higher aspect ratio metric is assessed. The Jacobian or Jacobian ratio metrics are representative of a measure of a deviation of a given element from an ideally shaped element or the representative element. In some examples, the Jacobian metric may range from −1.0 to 1.0, where 1.0 represents a match with the representative element.

At 306, the system may determine one or more second quality metrics based at least in part on a completeness of the mesh and/or scan. For example, the system may determine a percentage of the object represented by the scan. For instance, the system may utilize a surface area or exterior area determination and/or one or more bounding boxes based on the representative object to determine a percentage of the object represented in the mesh. The system may then determine the one or more second quality metrics based on one or more percentage or completeness thresholds and the determined percentage.

At 308, the system may determine one or more third quality metrics based at least in part on a presence, number, a location of one or more holes within the mesh. For example, the system may determine the presence of holes or other anomalies within the mesh. The system may then categorize the holes or other anomalies based on a size of each hole or anomaly. For example, the system may sort the holes or anomalies into a first category or group of holes being less than or equal to a predetermined portion of the mesh or less than or equal to a predetermined size and into a second category or group of holes being greater than (or equal to) the predetermined portion of the mesh or greater (or equal to) than the predetermined size. It should be understood that in other cases, the system may include more than two categories of sizes for the holes or other anomalies.

In some cases, the system may also consider the location or region of each hole or other anomaly within the mesh. For example, if the object is a foot, a hole or anomaly within the heel region or along a plantar surface of the foot may result in a lower quality score than holes along the ankle. Once the holes and other anomalies are categorized and regionalized with respect to the object, the system may then determine the one or more second quality metrics based at least in part on the number of holes in each category and the region of each hole with respect to the mesh.

At 310, the system may determine one or more fourth quality metrics based at least in part on a texture and/or visual appearance of the mesh. For instance, a Blind Mesh Quality Assessment Index (BMQI) which is based at least in part on an estimation of visual saliency and roughness may be used to determine the one or more fourth quality metrics.

At 312, the system may determine a final quality metric based at least in part on the one or more first quality metrics, the one or more second quality metrics, the one or more third quality metrics, and/or the one or more fourth quality metrics. For example, the system may combine the first quality metrics, the one or more second quality metrics, the one or more third quality metrics, and/or the one or more fourth quality metrics into a single metric. In other cases, the system may apply weights to the first quality metrics, the one or more second quality metrics, the one or more third quality metrics, and/or the one or more fourth quality metrics. In some cases, the weights may be based at least in part on the type or class of object, availability and quality of the representative object, and the like.

FIG. 4 is another example process flow diagram of a process 400 for determining quality metrics associated with a 3D mesh of an object according to some implementations. As discussed above, the system may utilize a number of different metrics and measurements to determine the quality of the 3D mesh generated by a scan of an object. For example, the system may utilize geometric properties, presence and number of holes or other anomalies, and/or comparisons (e.g., quantifiable similarities and differences) with respect to a representative object or representative mesh of the object.

At 402, the system may receive a 3D mesh of an object. For example, the mesh may be an initial mesh generated by a user equipment or concurrently with the scanning process. In other cases, the mesh may be a final or refined mesh that is generated via post scanning processing using various post scanning techniques.

At 404, the system may determine if the percentage of the object represented by the mesh is greater than or equal to a scan area threshold. For example, the scan area threshold may be a percentage such as 60%, 65%, 70%, or the like. If the percentage of the object represented by the mesh is greater than or equal to a scan area threshold, then the process 400 may advance to 408. Otherwise, the process 400 moves to 406.

At 406, the system may determine a quality metric based at least in part on the percentage of the object scanned. For example, if the percentage of the object represented by the mesh is greater than a first threshold (e.g., 50%) the system may apply a first quality metric (such as 40 on a scale of 0 to 100 or the like). Likewise, if the percentage of the object represented by the mesh is greater than a second threshold (e.g., 40%) the system may apply a second quality metric lower than the first quality metric (such as 20 on the scale of 0 to 100 or the like) or if the percentage of the object represented by the mesh is greater than a third threshold (e.g., 20%) the system may apply a third quality metric lower than the second quality metric (such as 10 on a scale of 0 to 100 or the like). If the percentage is less than the third threshold then the system may apply a fourth quality metric lower than the fourth quality metric (such as 0 on the scale of 0 to 100 or the like). In the current example, three thresholds are utilized, however, it should be understood that any number of thresholds and scores may be applied to provide, for instance, a more finely grained quality metric output by the system.

At 408, the system may detect holes or anomalies in the mesh. For example, the system may determine holes or anomalies using various techniques. For instance, the system may utilize a Half-Edge Data Structure and then iterate the mesh to find which vertices belong to a hole borders and vertices do not. As one illustrative example, the system may compare the mesh to a representative mesh to determine if features are missing. In another example, the system may determine gaps or the like in the image data or mesh such as caused by uneven or unaligned surfaces.

At 410, the system may, for each hole detected and based at least in part on a size of each hole, classify the hole into one of two or more categories. For example, in one implementation, the system may sort the holes or anomalies into a first category less than or equal to a first size and a second category greater than the first size. It should be understood that, in various implementations, any number of two or more categories or groups may be used to classify each hole or anomaly.

At 412, the system may determine a quality metric based at least in part on the number of holes in each of the two or more categories. For example, if the mesh has more than a first threshold number (e.g., 1, 2, or the like) holes or anomalies in the second category (e.g., the large category), the system may determine that a fifth quality metric score should be applied to the mesh (such as 60 on the scale of 0 to 100). If less than the first threshold number of holes or anomalies are in the second category then the system may apply a sixth quality metric score (such as 80 on the scale of 0 to 100). It should be understood that a second or any number of additional threshold numbers of holes or anomalies may be applied to the first category and/or the second category to determine the final quality metric. For example, if less than a minimum threshold number of holes or anomalies are found in the first category or the second category, then the system may provide a seventh quality metric greater than the sixth quality metric (such as 90+ on the scale of 0 to 100).

At 414, the system may output the quality metric generated either at 406 or 412, as discussed herein. For example, a cloud-based system may provide or send the quality metric to a user equipment or device and/or the user equipment or device may present the quality metric on a display. In some cases, the system may provide alerts or warning when the quality metric is below a threshold for the object/operation to be performed (e.g., such as a warning that the mesh should not be used in the medical operation such as production of a prosthetic or implant or the like due to, for instance, poor quality and/or expected misfitting final products).

FIG. 5 is another example process flow diagram of a process 500 for determining quality metrics associated with a 3D mesh of an object according to some implementations. As discussed above, the system may utilize a number of different metrics and measurements to determine the quality of the 3D mesh generated by a scan of an object. For example, the system may utilize geometric properties, presence and number of holes or other anomalies, and/or comparisons (e.g., quantifiable similarities and differences) with respect to a representative object or representative mesh of the object.

At 502, the system may receive a 3D mesh of an object. For example, the mesh may be an initial mesh generated by a user equipment or concurrently with the scanning process. In other cases, the mesh may be a final or refined mesh that is generated via post scanning processing using various post scanning techniques.

At 504, the system may determine if the percentage of the object represented by the mesh is greater than or equal to a scan area threshold. For example, the scan area threshold may be a percentage such as 60%, 65%, 70%, or the like. If the percentage of the object represented by the mesh is greater than or equal to a scan area threshold, then the process 500 may advance to 508. Otherwise, the process 500 moves to 506.

At 506, the system may determine a quality metric based at least in part on the percentage of the object scanned. For example, if the percentage of the object represented by the mesh is greater than a first threshold (e.g., 50%) the system may apply a first quality metric (such as 40 on a scale of 0 to 100 or the like). Likewise, if the percentage of the object represented by the mesh is greater than a second threshold (e.g., 40%) the system may apply a second quality metric lower than the first quality metric (such as 20 on the scale of 0 to 100 or the like) or if the percentage of the object represented by the mesh is greater than a third threshold (e.g., 20%) the system may apply a third quality metric lower than the second quality metric (such as 10 on a scale of 0 to 100 or the like). If the percentage is less than the third threshold then then system may apply a fourth quality metric lower than the fourth quality metric (such as 0 on the scale of 0 to 100 or the like). In the current example, three thresholds are utilized, however, it should be understood that any number of thresholds and scores may be applied to provide, for instance, a more finely grained quality metric output by the system.

At 508, the system may align the mesh using an approximated ground plane. For example, the system may align the mesh by when the scanning starts. On receipt of a first frame, the system may capture a portion of the mesh. There is a high probability that this portion represents the plantar surface of the object, to which the ground plane may be fit or be attached. In some cases, the system may perform a RANSAC plane fitting techniques on this first portion of the mesh.

At 510, the system may determine if the alignment between the mesh and the approximated ground plane was successful. If the alignment was determined or deemed to be successful the process 500 may advance to 514, otherwise, the process 500 may proceed to 512.

At 512, the system may perform a brute force ground plane fitting operation. For example, the system may generate a fit or score for each of the six degrees of freedom and then select the alignment having the best fit or the highest score. In some cases, the system may attempt to attach a plane from different angles around the mesh and tests if the fit is a successful alignment.

At 514, the system may detect holes or anomalies in the mesh. For example, the system may determine holes or anomalies using various techniques. As one illustrative example, the system may compare the mesh to a representative mesh to determine if features are missing. In another example, the system may determine gaps or the like in the image data or mesh such as caused by uneven or unaligned surfaces.

At 516, the system may, for each hole detected and based at least in part on a size of each hole, classify the hole into one of two or more categories. For example, in one implementation, the system may sort the holes or anomalies into a first category less than or equal to a first size and a second category greater than the first size. It should be understood that in various implementations any number of two or more categories or groups may be used to classify each hole or anomaly.

At 518, the system may determine if the alignment between the mesh and the approximated ground plane was successful. If the alignment was determined or deemed to be successful the process 500 may advance to 522, otherwise, the process 500 may proceed to 520.

At 520, the system may determine a quality metric based at least in part on the number of holes in each of the two or more categories. For example, if the mesh has more than a first threshold number (e.g., 1, 2, or the like) holes or anomalies in the second category (e.g., the large category), the system may determine that a fifth quality metric score should be applied to the mesh (such as 60 on the scale of 0 to 100). If less than the first threshold number of holes or anomalies are in the second category then the system may apply a sixth quality metric score (such as 80 on the scale of 0 to 100). It should be understood that a second or any number of additional threshold numbers of holes or anomalies may be applied to the first category and/or the second category to determine the final quality metric.

At 522, the system may, for each hole, determine a region of two or more regions of the mesh associated with each hole. For example, the object represented by the mesh may be divided into regions, some of which may have higher importance for the operations that may be performed using the resulting 3D mesh. In these cases, different regions may have more importance or weight when determining the quality metric of the mesh. For instance, a mesh having a hole or other anomaly in a region that is not associated with a resulting operation may result in a higher metric being assigned than a hole within a region that is central to the resulting operation.

At 524, the system may determine a quality metric based at least in part on the number of holes in each of the two or more categories in each region. For example, if the mesh has more than a first threshold number (e.g., 1, 2, or the like) holes or anomalies in the second category (e.g., the large category) and within a central region to the operation, the system may determine that the fifth quality metric score should be applied to the mesh (such as 60 on the scale of 0 to 100). If less than the first threshold number of holes or anomalies are in the second category or within the central region than the system may apply the sixth quality metric score (such as 80 on the scale of 0 to 100). It should be understood that a second or any number of additional threshold numbers of holes or anomalies may be applied to the first category and/or the second category to determine the final quality metric. For example, if less than a minimum threshold number of holes or anomalies are found in the first category or the second category, then the system may provide a seventh quality metric greater than the sixth quality metric (such as 90+ on the scale of 0 to 100).

At 526, the system may output the quality metric generated at 506, 520, or 524, as discussed herein. For example, a cloud-based system may provide or send the quality metric to a user equipment or device and/or the user equipment or device may present the quality metric on a display. In some cases, the system may provide alerts or warnings when the quality metric is below a threshold for the object/operation to be performed (e.g., such as a warning that the mesh should not be used in the medical operation such as production of a prosthetic or implant or the like due to, for instance, poor quality and/or expected misfitting final products).

Figure 6:
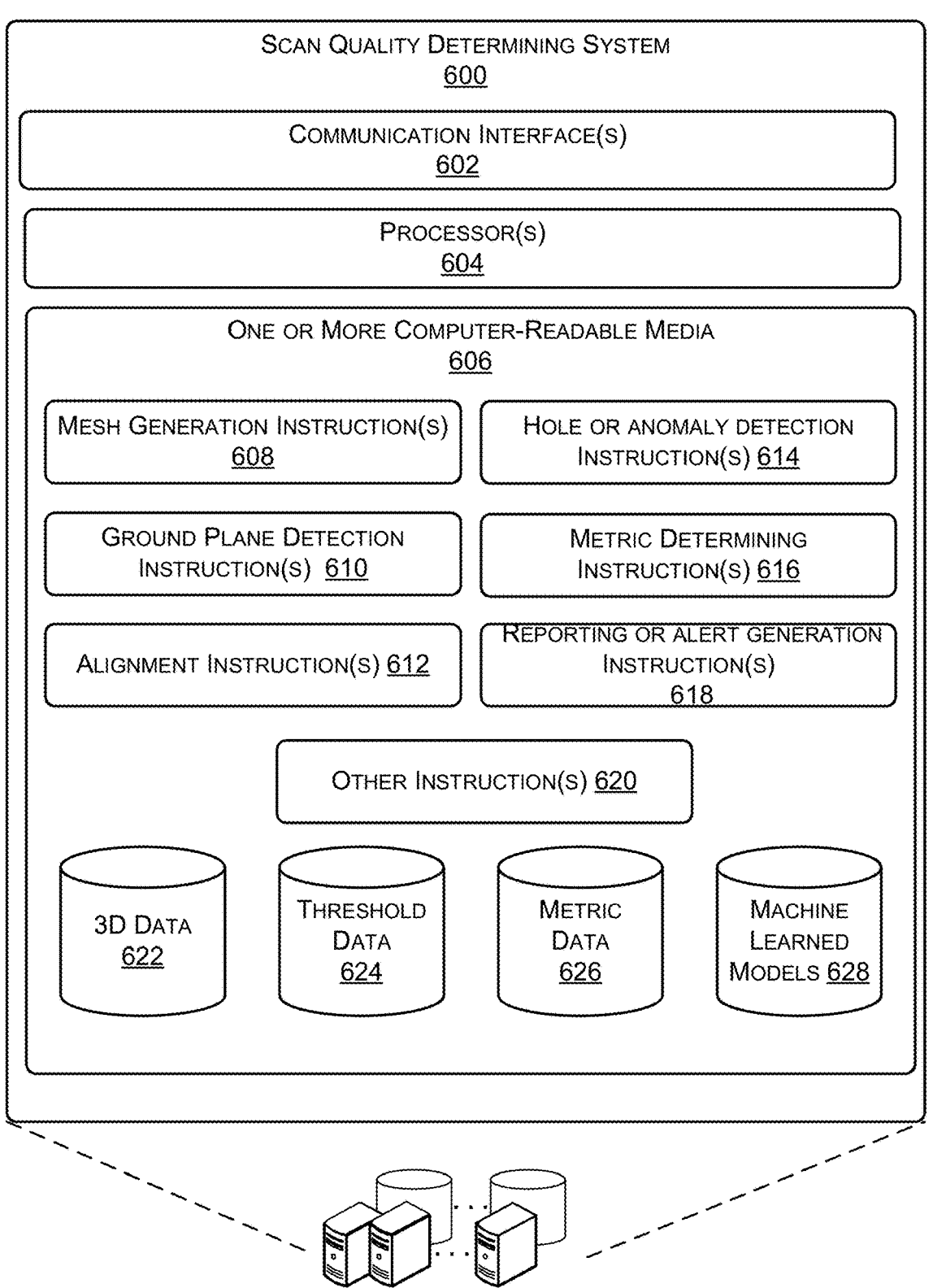
FIG. 6 is an example block diagram of an architecture for scan quality determining system according to some implementations.

FIG. 6 is an example block diagram of an architecture for a scan quality determining system 600 according to some implementations. The scan quality determining system 600 may include one or more communication interface(s) 602 that enables communication between the scan quality determining system 600 and one or more other local or remote computing device(s) or remote services, such as the user equipment. For instance, the communication interface(s) 602 can facilitate communication with other proximate sensor systems and/or other facility systems. The communications interfaces(s) 602 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

The scan quality determining system 600 may include one or more processors 604 and one or more computer-readable media 606. Each of the processors 604 may itself comprise one or more processors or processing cores. The computer-readable media 606 is illustrated as including memory/storage. The computer-readable media 606 may include volatile media (such as random access memory (RAM)) and/or nonvolatile media (such as read only memory (ROM), Flash memory, optical disks, magnetic disks, and so forth). The computer-readable media 606 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Several modules such as instructions, data stores, and so forth may be stored within the computer-readable media 606 and configured to execute on the processors 604. For example, as illustrated, the computer-readable media 606 stores mesh generation instructions 608, ground plane detection instructions 610, alignment instructions 612, hole or anomaly detecting instructions 614, metric determining instructions 616, reporting or alert generation instruction 618 as well as other instructions 620, such as an operating system. The computer-readable media 606 may also be configured to store data, such as 3D data 622, threshold data 624, metric data 626 (e.g., arch height and navicular drop data), machine learned models 628, as well as other data.

The mesh generation instructions 608 may be configured to receive the 3D scan or sensor data of the object and to generate a 3D model or mesh of the object.

The ground plane detection instructions 610 may process the 3D mesh of the object to determine or detect the ground plane. For example, the ground plane detection instructions 610 may disambiguate pixels representing the object from pixels representing the ground plane.

The alignment instructions 612 may be configured to align the mesh with the ground plane and the hole or anomaly detection instructions 614 may be configured to determine the presence and region of holes or other anomalies with respect to the mesh.

The metric determining instructions 614 may be configured to determine the quality metrics associated with the mesh. For example, the metric determining instructions may utilize geometric metrics, number of holes, location of holes, completeness, visual metrics, or the like to generate one or more quality metrics associated with the mesh or scan.

The reporting or alert generation instruction 518 may be configured to send or transmit the mesh, the metrics, the 3D mesh, warnings, and/or the like to one or more third-party system and/or the user equipment responsible for performing operations based at least in part on the mesh.

Figure 7:
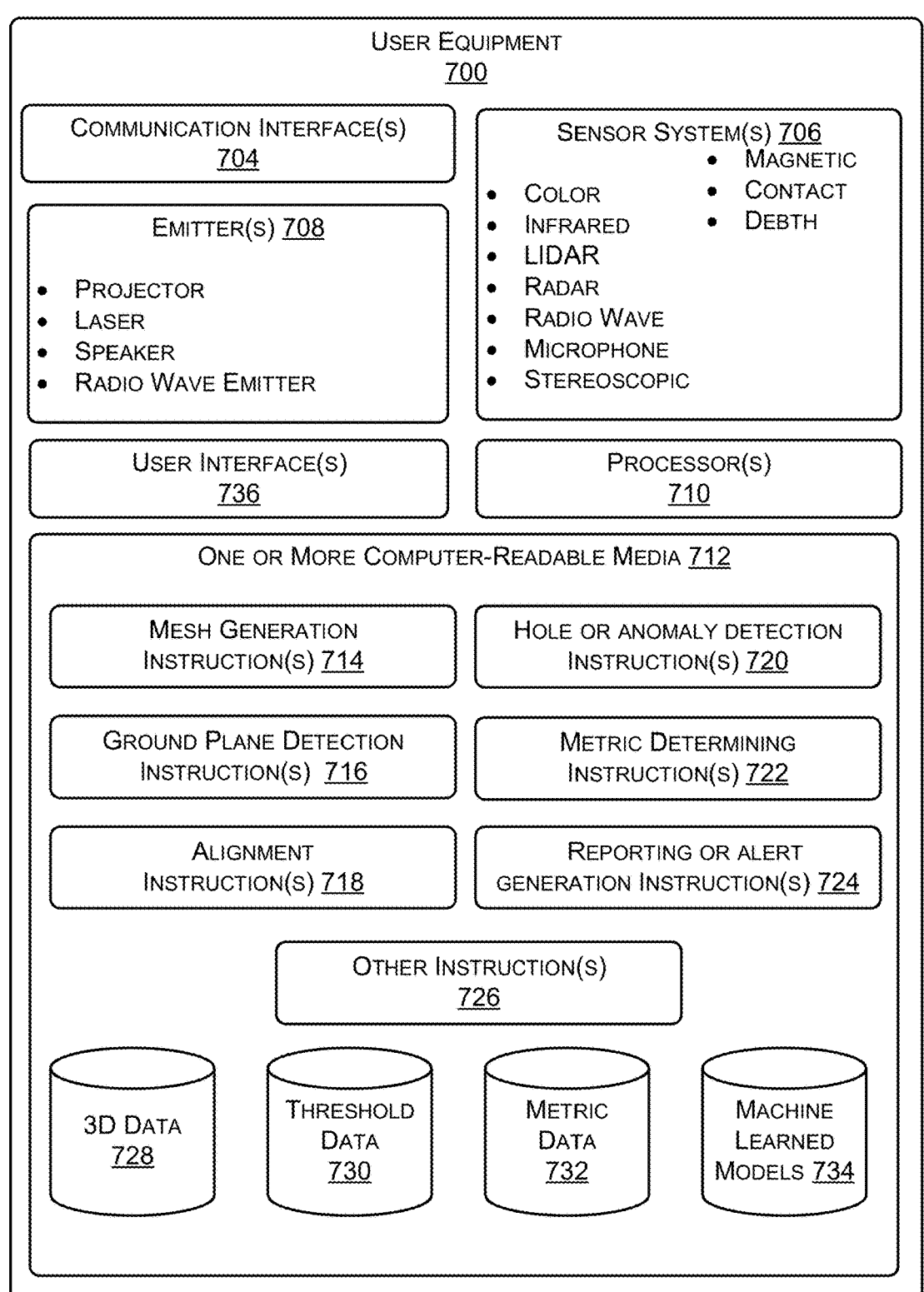
FIG. 7 is an example block diagram of an architecture for user equipment according to some implementations.

FIG. 7 is an example block diagram of an architecture for user equipment 700 associated with determining a quality of a mesh representative of an object that was scanned according to some implementations. The user equipment 700 may include one or more communication interface(s) 704 (also referred to as communication devices and/or modems), one or more sensor system(s) 706, and one or more emitter(s) 708.

The user equipment 700 can include one or more communication interfaces(s) 704 that enable communication between the user equipment 700 and one or more other local or remote computing device(s) or remote services, such as a cloud-based system of FIG. 1. For instance, the communication interface(s) 704 can facilitate communication with other proximate sensor systems, a central control system, or other facility systems. The communications interfaces(s) 704 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

The one or more sensor system(s) 706 may be configured to capture the 3D data 728 (or other image based data) associated with a feature (e.g., an object or the like). In at least some examples, the sensor system(s) 706 may include thermal sensors, time-of-flight sensors, location sensors, LIDAR sensors, radar sensors, sonar sensors, infrared sensors, cameras (e.g., RGB, IR, intensity, depth, etc.), magnetic sensors, microphone sensors, environmental sensors (e.g., temperature sensors, humidity sensors, light sensors, pressure sensors, etc.), and the like. In some examples, the sensor system(s) 706 may include multiple instances of each type of sensor. For instance, camera sensors may include multiple cameras disposed at various locations.

The user equipment 700 may also include one or more emitter(s) 708 for emitting light and/or sound. By way of example and not limitation, the emitters in this example include light, illuminators, lasers, patterns, such as an array of light, audio emitters, and the like.

The user equipment 700 may also include one or more user interfaces 736, such as input (e.g., mouse or keyboard) or output devices (e.g., a display). The user interfaces 736 may include a virtual environment display or a traditional two-dimensional display, such as a liquid crystal display or a light emitting diode display. The user interfaces 736 may also include one or more input components for receiving feedback from the user. In some cases, the input components may include tactile input components, audio input components, or other natural language processing components. In one specific example, the user interfaces 736 may be a combined touch enabled display.

The user equipment 700 may include one or more processors 710 and one or more computer-readable media 712. Each of the processors 710 may itself comprise one or more processors or processing cores. The computer-readable media 712 is illustrated as including memory/storage. The computer-readable media 712 may include volatile media (such as random access memory (RAM)) and/or nonvolatile media (such as read only memory (ROM), Flash memory, optical disks, magnetic disks, and so forth). The computer-readable media 712 may include fixed media (e.g., RAM, ROM, a fixed hard drive, and so on) as well as removable media (e.g., Flash memory, a removable hard drive, an optical disc, and so forth). The computer-readable media 712 may be configured in a variety of other ways as further described below.

Several modules such as instructions, data stores, and so forth may be stored within the computer-readable media 712 and configured to execute on the processors 710. For example, as illustrated, the computer-readable media 612 store instructions similar to those of the system 700 of FIG. 7 including mesh generation instructions 714, ground plane detection instructions 716, alignment instructions 718, hole or anomaly detection instructions 720, metric determining instruction 722, reporting or alert generation instructions 724, as well as other instructions 726. The computer-readable media 712 may also be configured to store data, such as 3D data 728, threshold data 730, metric data 732, machine learned models 734, and the like.

FIG. 8 is an example pictorial diagram of a three-dimensional mesh 800 of an object (e.g., a foot of a patient) according to some implementations. In the current example, the mesh includes a hole 802 along the top region of the foot.

Figure 9:
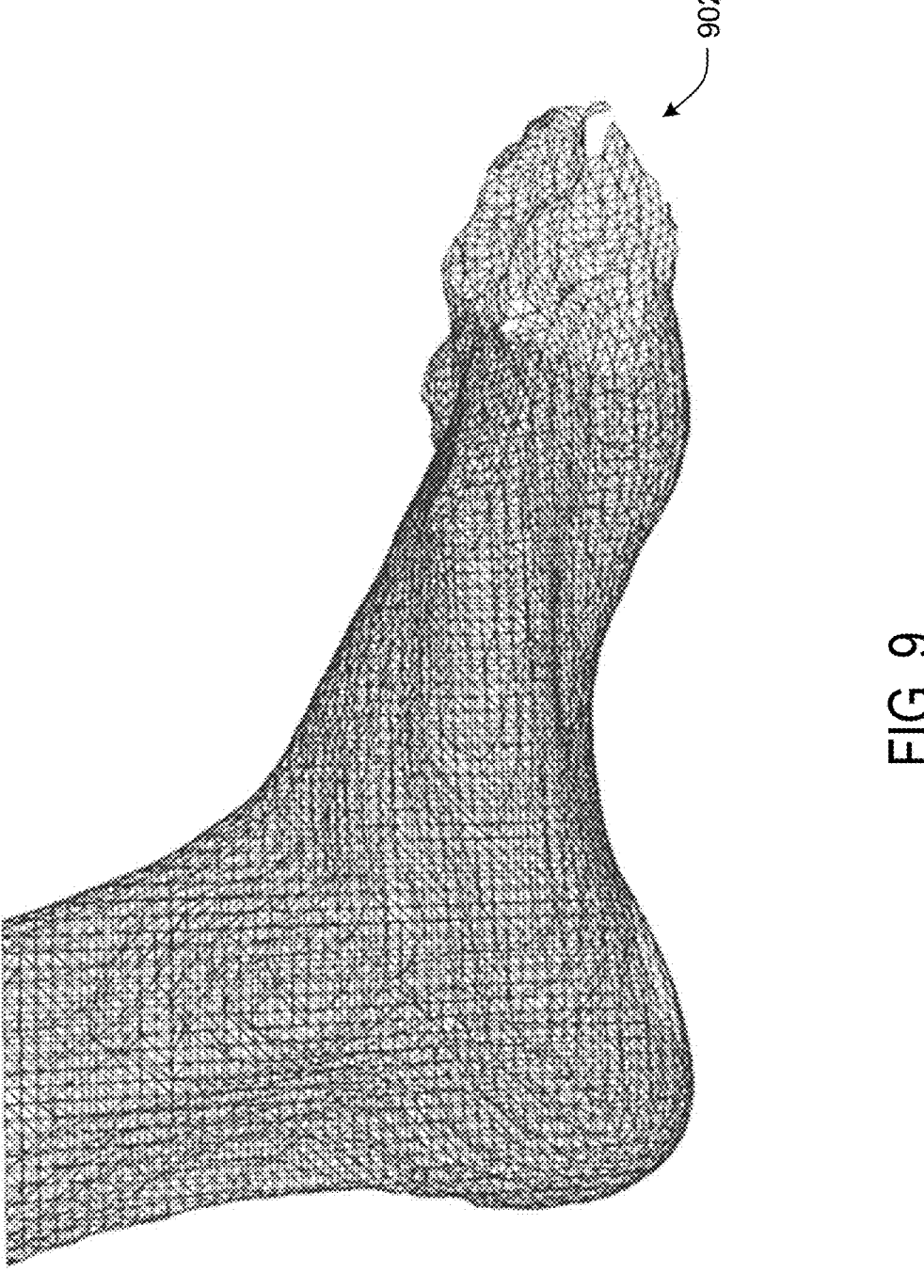
FIG. 9 is an example pictorial diagram of a three-dimensional mesh of an object according to some implementations.

FIG. 9 is an example pictorial diagram of a three-dimensional mesh 900 of an object (e.g., a foot of a patient) according to some implementations. In the current example, the mesh includes a hole 902 along the toe region of the foot.

Figure 10:
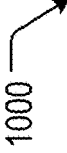
FIG. 10 is an example pictorial diagram of a three-dimensional mesh of an object according to some implementations.

FIG. 10 is an example pictorial diagram of a three-dimensional mesh 1000 of an object (e.g., a foot of a patient) according to some implementations. In the current example, the mesh includes a first large hole 1002 along the ankle region of the foot and a second small hole 1004 along the heel of the foot. In this example, the hole 1004 may be placed into the first category being less than a predetermined threshold and the hole 1002 may be placed into the second category being greater than a predetermined threshold.

Figure 11:
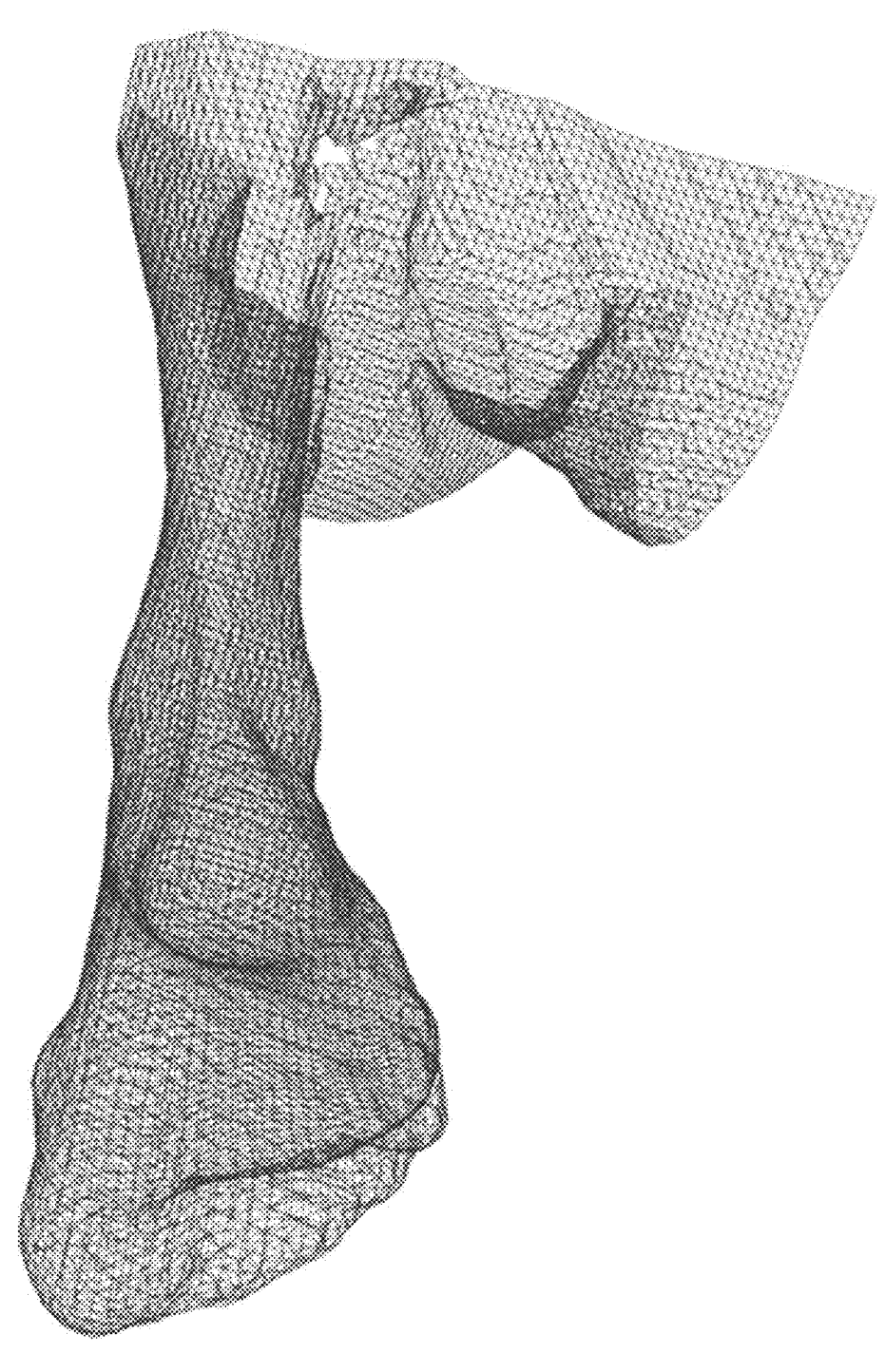
FIG. 11 is an example pictorial diagram of a three-dimensional mesh of an object according to some implementations.

FIG. 11 is an example pictorial diagram of a three-dimensional mesh 1100 of an object (e.g., a foot of a patient) according to some implementations. In this example, the mesh 1100 is complete and free of holes or other anomalies but may include other features attached, such as a portion of a leg of the patient in this example.

Figure 12:
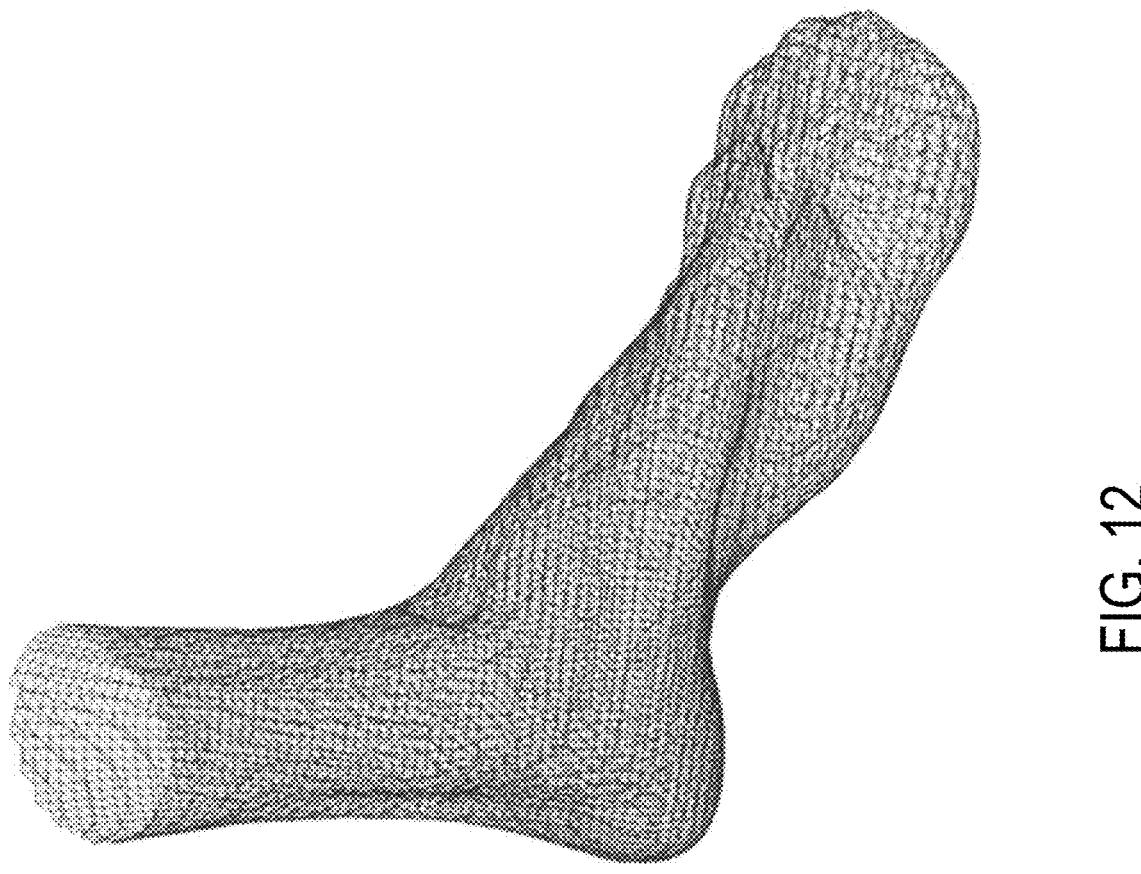
FIG. 12 is an example pictorial diagram of a three-dimensional mesh of an object according to some implementations.

FIG. 12 is an example pictorial diagram of a three-dimensional mesh 1200 of an object (e.g., a foot of a patient) according to some implementations. In this example, the mesh 1200 is complete and free of holes or other anomalies.

Figure 13:
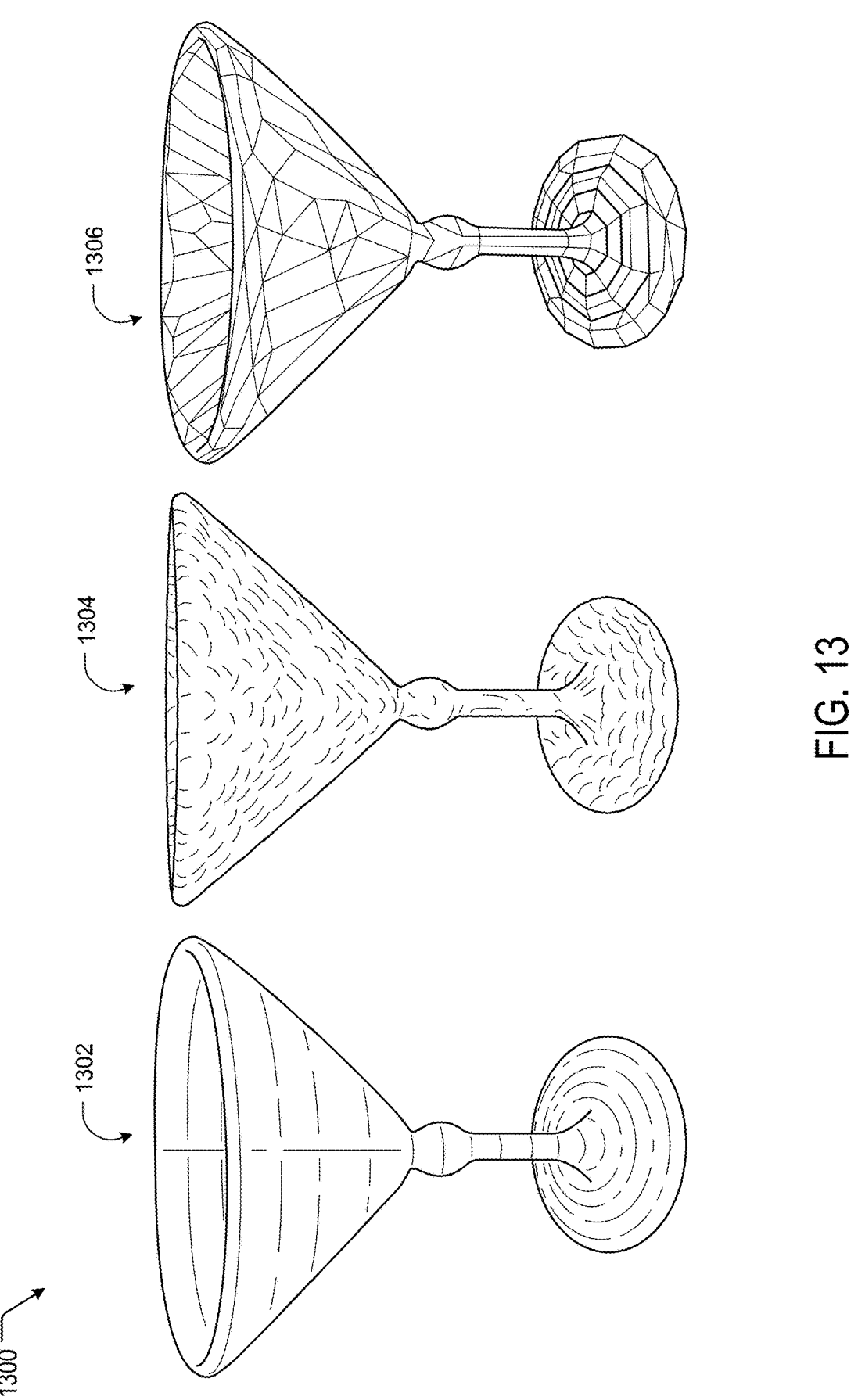
FIG. 13 is an example pictorial diagram of three scans of a three-dimensional object according to some implementations.

FIG. 13 is an example pictorial diagram 1300 of three scans 1302-1306 of a three-dimensional object (e.g., a cup) 1200 according to some implementations. In the current example, the first scan 1302 has a higher quality as the visual appearance is smoother and more refined than the scans 1304 and 1306. Accordingly, in this example, the first scan 1302 may have a higher quality metric than the scans 1304 and 1306.

Figure 14:
FIG. 14 is an example pictorial diagram of a three-dimensional scan of an object that has a low quality metric according to some implementations.

FIG. 14 is an example pictorial diagram of a three-dimensional scan 1400 of an object (e.g., a foot of a patient) that has a low quality metric according to some implementations. For instance, in this example, the quality metric may be equal to or below 30 on the scale of 0 to 100 discussed above.

Figure 15:
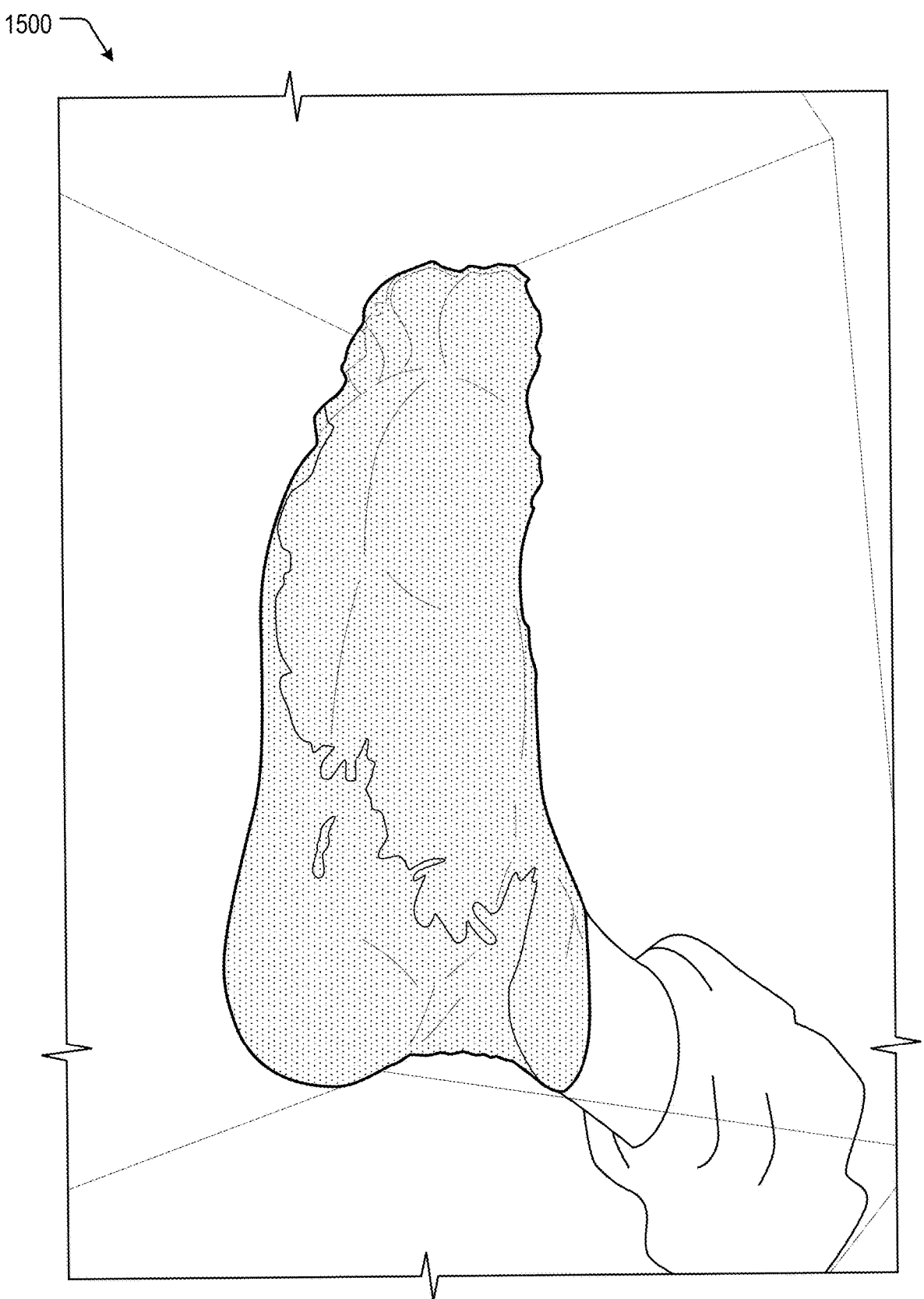
FIG. 15 is an example pictorial diagram of a three-dimensional scan of an object that has a mid-level quality metric according to some implementations.

FIG. 15 is an example pictorial diagram of a three-dimensional scan 1500 of an object (e.g., a foot of a patient) that has a mid-level quality metric according to some implementations. For instance, in this example, the quality metric may be between 30 and 70 on the scale of 0 to 100 discussed above.

Figure 16:
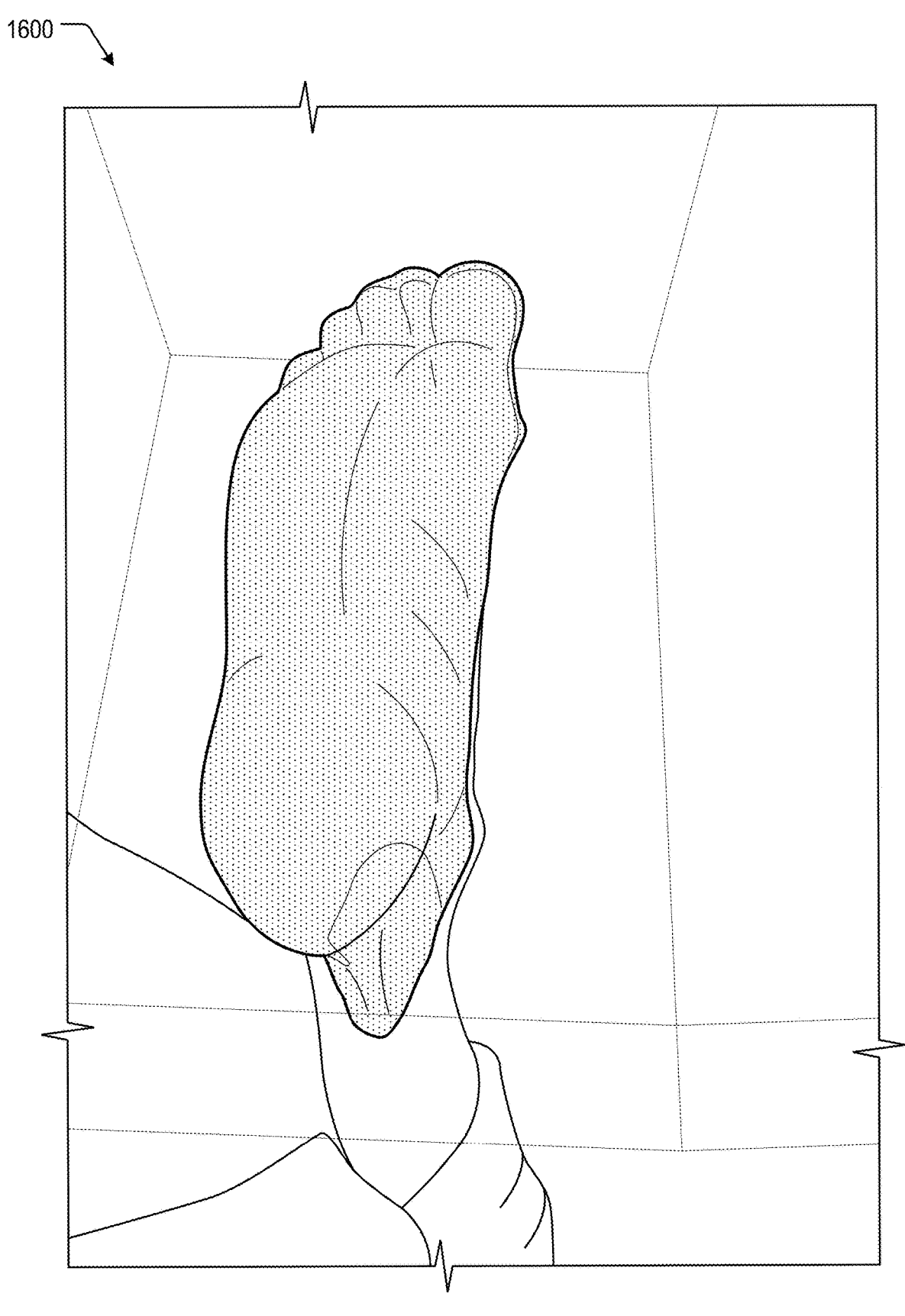
FIG. 16 is an example pictorial diagram of a three-dimensional scan of an object that has a high quality metric according to some implementations.

FIG. 16 is an example pictorial diagram of a three-dimensional scan 1600 of an object (e.g., a foot of a patient) that has a high quality metric according to some implementations. For instance, in this example, the quality metric may be equal to or above 70 on the scale of 0 to 100 discussed above.

Although the discussion above sets forth example implementations of the described techniques, other architectures may be used to implement the described functionality and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

Example Clauses

A. A method comprising: receiving, from user equipment, image data of an object; generating, based at least in part on the image data, a three-dimensional mesh representing the object; determining a percentage of the object represented by the three-dimensional mesh; and determining, based at least in part on the percentage of the object, one or more quality metrics associated with the three-dimensional mesh.

B. The method of A, further comprising:
determining an approximated ground plane associated with the three-dimensional mesh; and aligning the three-dimensional mesh with the approximated ground plane.

C. The method of B, wherein determining, based at least in part on the alignment, a length, a width, and a girth of the mesh; determining, based at least in part on the length, the width, the girth, and one or more threshold ranges a success of the alignment between the three-dimensional mesh and the approximated ground plane.

D. The method of A, wherein the three-dimensional mesh is an initial three-dimensional mesh generated concurrently with generating the image data and the one or more quality scores are one or more initial quality score associated with the method further comprises: generating, based at least in part on the image data and the initial three-dimensional mesh, a final three-dimensional mesh representing the object; and determining, based at least in part on the final three-dimensional mesh, one or more final quality metrics associated with the final three-dimensional mesh.

E. The method of D, wherein the initial three-dimensional mesh is generated using a truncated signed differences function (TSDF).

F. The method of D, wherein determining the percentage of the object represented by the three-dimensional mesh is based at least in part on a representative object, the representative object generated by one or more machine learning models trained on image data and mesh data of a plurality of instances of the object in various positions, orientations, and under various conditions.

G. The method of A, wherein determining the one or more quality metrics associated with the three-dimensional mesh is based at least in part on a geometric property of the three-dimensional mesh.

H. The method of G, wherein the geometric property is one or more of the following: skewness metric determined based on an equiangular skew of the three-dimensional mesh; maximum angle metric determined based at least in part on a presence of first elements of the three-dimensional mesh with large angles within the three-dimensional mesh; volume versus circumradius metric determined based at least in part on a quotient of an object volume and a radius of a circumscribed sphere of a representative model of the object; volume versus length metric determined based at least in part on a quotient of an edge length of the three-dimensional mesh and a volume of the three-dimensional mesh compared to a representative model of the object; conditions number metric determined based at least in part on one or more properties of a matrix transformation of the three-dimensional mesh to the representative model of the object; growth rate metric determined based at least in part on a comparison of a size of a second element of the three-dimensional mesh to a size of neighboring elements of the three-dimensional mesh in one or more directions; curved skewness metric determined based at least in part on a measure of a deformation of a third element of the three-dimensional mesh from a higher-order element associate with the third element of the three-dimensional mesh; aspect ratio metric determined based at least in part on a similarity between a fourth element of the three-dimensional mesh and the fourth element within the representative model of the object; or Jacobian metric determined based at least in part on a deviation of a fifth element of the three-dimensional mesh from the fifth element within the representative model of the object.

I. The method of A, further comprising: determining a number of holes within the three-dimensional mesh; and wherein determining the one or more quality metrics associated with the three-dimensional mesh is based at least in part on the number of holes within the three-dimensional mesh.

J. The method of I, further comprising: detecting one or more holes within the three-dimensional mesh; determining a size of individual ones of the one or more holes; and classifying the individual ones of the one or more holes into a first category or a second category based at least in part on the corresponding size; and wherein determining the one or more quality metrics associated with the three-dimensional mesh is based at least in part on the number of holes within the first category.

K. The method of I, further comprising: detecting one or more holes within the three-dimensional mesh; determining two or more regions associated with the three-dimensional mesh; and assigning individual ones of the one or more holes into one of the two or more regions; and wherein determining the one or more quality metrics associated with the three-dimensional mesh is based at least in part on a number of holes in individual ones of the two or more regions.

L. The method of K, wherein the two or more regions includes a first region and a second region and the method further comprises: applying a first weight to individual holes assigned to the first region; and applying a second weight to individual holes assigned to the second region; and wherein determining the one or more quality metrics associated with the three-dimensional mesh is based at least in part on a metric associated with a weight associated with the one or more holes.

M. One or more non-transitory computer-readable media storing instructions that, when executed by one or more processors, cause the one or more processors to perform operations comprising: receiving, from user equipment, image data of an object; generating, based at least in part on the image data, a three-dimensional mesh representing the object; determining a percentage of the object represented by the three-dimensional mesh; determining an approximated ground plane associated with the three-dimensional mesh; aligning the three-dimensional mesh to the approximated ground plane; detecting one or more holes associated with the three-dimensional mesh; determining a size of individual ones of the one or more holes; and determining, based at least in part on the percentage of the object, a number of the one or more holes, a size of the individual ones of the one or more holes, and a success of the alignment, one or more quality metrics associated with the three-dimensional mesh.

N. The one or more non-transitory computer-readable media of M, further comprising: determining a region of the three-dimensional mesh associated with the individual ones of the one or more holes; and wherein determining the one or more quality metrics associated with the three-dimensional mesh is based at least in part on the region associated with the individual ones of the one or more holes.

O. The one or more non-transitory computer-readable media of M, further comprising: determining a category for individual ones of the one or more holes; and wherein determining the one or more quality metrics associated with the three-dimensional mesh is based at least in part on the category associated with the individual ones of the one or more holes.

P. The one or more non-transitory computer-readable media of O, wherein the category is determined, for the individual ones of the one or more holes, based at least in part on a size corresponding to each hole and one or more size thresholds.

Q. The one or more non-transitory computer-readable media of M, further comprising performing one or more operations based on the three-dimension mesh in response to the one or more quality metrics meeting or exceeding a threshold.

R. The one or more non-transitory computer-readable media of M, further comprising preventing one or more operations based on the three-dimension mesh from initiating in response to the one or more quality metrics failing to meet or exceed a threshold.

S. A system comprising: one or more processors; and one or more non-transitory computer-readable media storing instructions that, when executed by the one or more processors, cause the one or more processors to perform operations comprising: receiving, from user equipment, image data of an object; generating, based at least in part on the image data, a three-dimensional mesh representing the object; determining a percentage of the object represented by the three-dimensional mesh; detecting one or more holes associated with the three-dimensional mesh; determining a size of individual ones of the one or more holes; and determining, based at least in part on the percentage of the object and a size of the individual ones of the one or more holes, one or more quality metrics associated with the three-dimensional mesh.

T. The system of S, wherein the operations further comprise: determining a first region and a second region associated with the three-dimensional mesh; and assigning the individual ones of the one or more holes to either the first region or the second region; and wherein determining the one or more quality metrics associated with the three-dimensional mesh is based at least in part on a number of holes assigned to the first region.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

Conclusion

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:

receiving, from user equipment, image data of an object;

generating, based at least in part on the image data, a three-dimensional mesh representing the object;

determining a percentage of the object represented by the three-dimensional mesh; and determining, based at least in part on the percentage of the object, one or more quality metrics associated with the three-dimensional mesh.

2. The method of claim 1, further comprising:

determining an approximated ground plane associated with the three-dimensional mesh; and aligning the three-dimensional mesh with the approximated ground plane.

3. The method of any of claim 2, wherein determining, based at least in part on the alignment, a length, a width, and a girth of the mesh;

determining, based at least in part on the length, the width, the girth, and one or more threshold ranges a success of the alignment between the three-dimensional mesh and the approximated ground plane.

4. The method of claim 1, wherein the three-dimensional mesh is an initial three-dimensional mesh generated concurrently with generating the image data and the one or more quality scores are one or more initial quality score associated with the method further comprises:

generating, based at least in part on the image data and the initial three-dimensional mesh, a final three-dimensional mesh representing the object; and determining, based at least in part on the final three-dimensional mesh, one or more final quality metrics associated with the final three-dimensional mesh.

5. The method of claim 4, wherein the initial three-dimensional mesh is generated using a truncated signed differences function (TSDF).

6. The method of claim 5, wherein determining the percentage of the object represented by the three-dimensional mesh is based at least in part on a representative object, the representative object generated by one or more machine learning models trained on image data and mesh data of a plurality of instances of the object in various positions, orientations, and under various conditions.

7. The method of claim 1, wherein determining the one or more quality metrics associated with the three-dimensional mesh is based at least in part on a geometric property of the three-dimensional mesh.

8. The method of claim 7, wherein the geometric property is one or more of the following:

skewness metric determined based on an equiangular skew of the three-dimensional mesh;

maximum angle metric determined based at least in part on a presence of first elements of the three-dimensional mesh with large angles within the three-dimensional mesh;

volume versus circumradius metric determined based at least in part on a quotient of an object volume and a radius of a circumscribed sphere of a representative model of the object;

volume versus length metric determined based at least in part on a quotient of an edge length of the three-dimensional mesh and a volume of the three-dimensional mesh compared to a representative model of the object;

conditions number metric determined based at least in part on one or more properties of a matrix transformation of the three-dimensional mesh to the representative model of the object;

growth rate metric determined based at least in part on a comparison of a size of a second element of the three-dimensional mesh to a size of neighboring elements of the three-dimensional mesh in one or more directions;

curved skewness metric determined based at least in part on a measure of a deformation of a third element of the three-dimensional mesh from a higher-order element associate with the third element of the three-dimensional mesh;

aspect ratio metric determined based at least in part on a similarity between a fourth element of the three-dimensional mesh and the fourth element within the representative model of the object; or Jacobian metric determined based at least in part on a deviation of a fifth element of the three-dimensional mesh from the fifth element within the representative model of the object.

9. The method of claim 1, further comprising:

determining a number of holes within the three-dimensional mesh; and wherein determining the one or more quality metrics associated with the three-dimensional mesh is based at least in part on the number of holes within the three-dimensional mesh.

10. The method of claim 9, further comprising:

detecting one or more holes within the three-dimensional mesh;

determining a size of individual ones of the one or more holes; and classifying the individual ones of the one or more holes into a first category or a second category based at least in part on the corresponding size; and wherein determining the one or more quality metrics associated with the three-dimensional mesh is based at least in part on the number of holes within the first category.

11. The method of claim 9, further comprising:

detecting one or more holes within the three-dimensional mesh;

determining two or more regions associated with the three-dimensional mesh; and assigning individual ones of the one or more holes into one of the two or more regions; and wherein determining the one or more quality metrics associated with the three-dimensional mesh is based at least in part on a number of holes in individual ones of the two or more regions.

12. The method of claim 11, wherein the two or more regions includes a first region and a second region and the method further comprises:

applying a first weight to individual holes assigned to the first region; and applying a second weight to individual holes assigned to the second region; and wherein determining the one or more quality metrics associated with the three-dimensional mesh is based at least in part on a metric associated with a weight associated with the one or more holes.

13. One or more non-transitory computer-readable media storing instructions that, when executed by one or more processors, cause the one or more processors to perform operations comprising:

receiving, from user equipment, image data of an object;

generating, based at least in part on the image data, a three-dimensional mesh representing the object;

determining a percentage of the object represented by the three-dimensional mesh;

determining an approximated ground plane associated with the three-dimensional mesh;

aligning the three-dimensional mesh to the approximated ground plane;

detecting one or more holes associated with the three-dimensional mesh;

determining a size of individual ones of the one or more holes; and determining, based at least in part on the percentage of the object, a number of the one or more holes, a size of the individual ones of the one or more holes, and a success of the alignment, one or more quality metrics associated with the three-dimensional mesh.

14. The one or more non-transitory computer-readable media of claim 13, further comprising:

determining a region of the three-dimensional mesh associated with the individual ones of the one or more holes; and wherein determining the one or more quality metrics associated with the three-dimensional mesh is based at least in part on the region associated with the individual ones of the one or more holes.

15. The one or more non-transitory computer-readable media of claim 13, further comprising:

determining a category for individual ones of the one or more holes; and wherein determining the one or more quality metrics associated with the three-dimensional mesh is based at least in part on the category associated with the individual ones of the one or more holes.

16. The one or more non-transitory computer-readable media of claim 15, wherein the category is determined, for the individual ones of the one or more holes, based at least in part on a size corresponding to each hole and one or more size thresholds.

17. The one or more non-transitory computer-readable media of claim 13, further comprising performing one or more operations based on the three-dimension mesh in response to the one or more quality metrics meeting or exceeding a threshold.

18. The one or more non-transitory computer-readable media of claim 13, further comprising preventing one or more operations based on the three-dimension mesh from initiating in response to the one or more quality metrics failing to meet or exceed a threshold.

19. A system comprising:

one or more processors; and one or more non-transitory computer-readable media storing instructions that, when executed by the one or more processors, cause the one or more processors to perform operations comprising:

receiving, from user equipment, image data of an object;

generating, based at least in part on the image data, a three-dimensional mesh representing the object;

determining a percentage of the object represented by the three-dimensional mesh;

detecting one or more holes associated with the three-dimensional mesh;

determining a size of individual ones of the one or more holes; and determining, based at least in part on the percentage of the object and a size of the individual ones of the one or more holes, one or more quality metrics associated with the three-dimensional mesh.

20. The system of claim 19, wherein the operations further comprise:

determining a first region and a second region associated with the three-dimensional mesh; and assigning the individual ones of the one or more holes to either the first region or the second region; and wherein determining the one or more quality metrics associated with the three-dimensional mesh is based at least in part on a number of holes assigned to the first region.

* * * * *